United States Patent [19]
Ohsumi

[11] Patent Number: 5,588,609
[45] Date of Patent: Dec. 31, 1996

[54] SEAT BELT WINDING DEVICE

[75] Inventor: Sadanori Ohsumi, Kanagawa, Japan

[73] Assignee: NSK Ltd., Tokyo, Japan

[21] Appl. No.: 419,989

[22] Filed: Apr. 11, 1995

[30] Foreign Application Priority Data

Apr. 13, 1994 [JP] Japan .................................. 6-097891
Apr. 18, 1994 [JP] Japan .................................. 6-101701

[51] Int. Cl.$^6$ ............................ B60R 22/28; B60R 22/42
[52] U.S. Cl. ................... 242/376; 242/379.1; 242/381.4
[58] Field of Search ............................ 242/381.1, 381.4, 242/379.1, 376; 280/806; 297/470, 471, 472, 476, 477, 478

[56] References Cited

U.S. PATENT DOCUMENTS

| | | | |
|---|---|---|---|
| 2,350,369 | 6/1944 | Sampair et al. ........................ | 206/59 |
| 4,206,887 | 6/1980 | De Rosa . | |
| 4,256,273 | 3/1981 | Burleigh ............................. | 242/379.1 |
| 4,422,593 | 12/1983 | Takada . | |
| 4,453,681 | 6/1984 | Gueguen et al. . | |
| 4,949,995 | 8/1990 | Haland et al. ......................... | 280/805 |
| 5,014,927 | 5/1991 | Ogawa et al. . | |
| 5,154,368 | 10/1992 | Fujimura et al. . | |
| 5,174,604 | 12/1992 | Numazawa et al. ..................... | 280/806 |
| 5,242,213 | 9/1993 | Fohl ...................................... | 297/472 |
| 5,299,854 | 4/1994 | Fujimura et al. ...................... | 297/472 |
| 5,323,977 | 6/1994 | Frei et al. . | |
| 5,460,338 | 10/1995 | Hirata et al. ......................... | 242/381.1 |

FOREIGN PATENT DOCUMENTS

| | | |
|---|---|---|
| A20297537 | 1/1989 | European Pat. Off. . |
| 1506641 | 10/1969 | Germany . |
| 2452336C2 | 5/1976 | Germany . |
| 2926893A1 | 1/1980 | Germany . |
| 3733611A1 | 4/1989 | Germany . |
| 8914928U1 | 4/1990 | Germany . |
| 4-43551 | 4/1992 | Japan . |
| 4-43550 | 4/1992 | Japan . |
| 2024607 | 1/1980 | United Kingdom . |
| 2208264 | 3/1989 | United Kingdom . |
| 2239387 | 7/1991 | United Kingdom . |
| 2252031 | 7/1992 | United Kingdom . |

*Primary Examiner*—John M. Jillions
*Attorney, Agent, or Firm*—Sughrue, Mion, Zinn, Macpeak & Seas

[57] ABSTRACT

In a seat belt winding device with a clamping mechanism for directly holding a webbing in an emergency of a vehicle, since the plastic deformation is repeated in stages in both of a clamp supporting device and plastically deforming members, a larger amount of kinetic energy can be absorbed on the side of the seat belt winding device. Further, when the webbing holding by the clamping mechanism is removed, not only the diameter of a plastically deforming member of a bobbin can be reduced greatly since the plastically deforming members project in the radial direction of the bobbin, but also the deforming direction of the plastically deforming members due to the tightening of the webbing can be specified because end surfaces of the plastically deforming members are respectively formed in an inclined surface Which is inclined in a specific direction. This allows the substantial winding diameter of the bobbin to be reduced uniformly and positively.

20 Claims, 22 Drawing Sheets

FIG. 4

SEAT BELT WINDING DEVICE

BACKGROUND OF THE INVENTION

The present invention relates to a seat belt winding device for use in a vehicle and the like, and particularly to a seat belt winding device which, when a tension exceeding a predetermined level is applied to a seat belt due to shocks produced in a collision or the like, draws out the seat belt to lessen a deceleration acting on the body of an occupant, thereby being able to protect the occupant more effectively.

Conventionally, in a vehicle or the like, there is used a seat belt winding device employing a seat belt which restrains the body of the occupant to a seat for protecting the occupant from collision shocks. In the conventional seat belt winding device, there is employed a clamping mechanism which, in an emergency such as a collision or the like, not only locks the rotation of a winding shaft with the seat belt wound therearound but also holds the seat belt to prevent the seat belt from being drawn out, whereby it is improved in its performance to restrain the occupant to the seat in the early stages of the collision.

A conventional seat belt winding device with a simple clamping mechanism functioning so as to prevent the seat belt from drawing out by locking the webbing, operates as indicated by a dotted line in FIG. 25, in the emergency. As time passes after vehicle collision, a tension of the webbing increases. When a shock by the collision is extremely large, an abrupt deceleration acts on the body of the occupant.

To solve this problem, there is proposed an improved version of the above-mentioned clamping mechanism. According to the improved clamping mechanism, in the early stages of the collision in which the tension to be applied to the seat belt due to the collision is smaller than a predetermined value, the clamping mechanism is operated to prevent the draw-out of the seat belt in order to restrain the occupant body to the seat positively. After then, at a time when the tension acting on the seat belt exceeds a predetermined value, the operation of the clamping mechanism is removed to draw out the seat belt a predetermined amount, thereby lessening the deceleration applied to the occupant body to protect the occupant body more positively.

In FIGS. 26 and 27, there is shown a conventional seat belt winding device including a clamping mechanism which, in the early stages of a collision where the tension acting on a seat belt or a webbing due to the collision is smaller than a predetermined value, holds the webbing therebetween to prevent the draw-out of the webbing and, after the webbing is held therebetween, when the tension acting on the webbing exceeds a predetermined value, allows the draw-out of the webbing.

The seat belt winding device 1 shown in FIGS. 26 and 27 is disclosed in Unexamined Japanese Utility Model Publication No. Hei. 4-43551. According to the present seat belt winding device 1, in an emergency such as a vehicle collision or the like, a winding shaft 3 with a webbing 2 (which serves as a seat belt) wound thereon is locked by an emergency locking mechanism 4 to prevent the draw-out of the webbing 2 due to the rotational movement of the winding shaft 3. At the same time, the webbing 2 drawn out on the back plate portion 5a of a retractor base 5 from the winding shaft 3 is held by and between a clamping mechanism, thereby preventing the webbing 2 remaining wound on the winding shaft 3 (actually, on a bobbin) from being drawn out due to the tightening of the webbing 2.

The clamping mechanism includes a clamp shaft 6 having the two ends thereof supported by a pair of base side plates 5b of the retractor base 5, a clamp holder 7 supported such that it can be swung about the clamp shaft 6 along the webbing 2 drawn out on the back plate portion 5a of the retractor base 5, and a clamp member 8 mounted on the end portion of the clamp holder 7. According to this clamping mechanism, in an emergency, the clamp holder 7 is swung in a direction of an arrow B in FIG. 26 to press the clamp member 8 against the webbing 2 so that the webbing 2 is held by and between the back plate portion 5a and clamp member 8, thereby preventing the draw-out of the webbing 2 in a direction of an arrow A in FIG. 26.

Here, the clamp member 8, as also shown in FIG. 27, has a semi-cylindrical outer shape and includes in the two end portions thereof two support shaft portions 8a which can be rotatably supported by the clamp holder 7, while the clamp member 8 is rotatably held on the end portion of the clamp holder 7 with the semi-circular outer peripheral surface 8b thereof situated on the side of the clamp holder 7. On the flat surface of the clamp member 8 facing the webbing 2, as shown in FIG. 27, there are formed a large number of holding portions (clamp teeth) 8c which, when pressed against the webbing 2, stick into the webbing with their respective sharpened portions to prevent the draw-out of the webbing. Further, the strengths and dimensions of the respective holding portions 8c can be set appropriately so that, when a load of a predetermined value is applied to the end portions of the holding portions 8c, the end portions can be sheared to remove the webbing from its holding state.

According to the conventional clamping mechanism shown in FIGS. 26 and 27, in the early stages of occurrence of an emergency, the clamp member 8 is pressed against the webbing 2 to stick the holding portions 8c of the clamp member 8 into the webbing 2 in the holding state. Thus, the webbing 2 is firmly secured to prevent the draw-out of the webbing 2. After holding the webbing, when the tension acting on the webbing 2 due to the inertial energy or the like of the occupant exceeds a predetermined value, the holding portions 8c are sheared to remove the webbing from its holding condition, in order to lessen the shocks to be applied to the occupant body due to the restraint of the webbing.

Now, in FIG. 28, there is shown a webbing holding condition in which the clamping mechanism is operated and thus the clamp member 8 sticks into the webbing 2 with the holding portions 8c of the clamp member 8 to prevent the draw-out of the webbing 2. Also, in FIG. 29, there is shown a condition in which, after the webbing is held, the tension acting on the webbing exceeds a predetermined value and thus the holding portions 8c are sheared to remove the holding of the webbing. In this case, the end portions 8d of the sheared holding portions 8c are left embedded in the webbing 2.

In this manner, in the structure that the webbing holding is removed if the tension acting on the webbing after the webbing holding increases and exceeds a predetermined value, the variations of the webbing tension after the occurrence of collision show such a characteristic as indicated by a two-dot chained line in FIG. 25. That is, when the webbing tension reaches a predetermined value P1, then the draw-out of the webbing due to the tightening thereof or the like starts so that the webbing tension decreases and, if the draw-out of the webbing is prevented, then the webbing tension rises again from the then tension P2 up to a tension P3 of a value greater than the P1. According to this structure, the maximum tension acting on the seat belt can be reduced as compared with a structure employing a clamping mechanism having no clamp removal function.

The actual operation for reducing the maximum tension acting on the seat belt in this manner is not limited to the above-mentioned shearing of the holding portions 8c. For example, in U.S. Pat. No. 5,299,854, there is disclosed a technique in which a part of the side wall portion of a retractor base supporting a clamp shaft is designed as a weak portion which is low in strength. When the tension acting on the webbing increases and exceeds a predetermined value, then the webbing holding condition is removed by deforming or breaking the weak portion, thereby preventing an increase in the webbing tension.

Also, in Unexamined Japanese Utility Model Publication No. Hei. 4-43550, there is disclosed a technique which, if the tension acting on the webbing increases and exceeds a predetermined value, then a clamp shaft is plastically deformed or broken by itself to remove the webbing holding condition so as to prevent an increase in the webbing tension.

Further, in U.S. Pat. No. 5,242,213, there is disclosed a technique which, if the tension acting on the webbing increases and exceeds a predetermined value, then a retractor base itself supporting the clamping mechanism is broken in such a manner as to permit the movement of the clamping mechanism in the webbing draw-out direction, thereby preventing an increase in the belt tension.

In the above-mentioned technique disclosed in Unexamined Japanese Utility Model Publication No. Hei. 4-43551, to appropriately reduce the maximum tension acting on the seat belt, a timing for removing the webbing holding by shearing the holding portions 8c must be made to correspond accurately to the tension acting on the webbing. Also, to reduce effectively shocks to be applied to the occupant body from the webbing in a collision or the like, not only the maximum tension acting on the seat belt must be reduced but also it is important to avoid an abrupt increase or decrease in the tension of the seat belt as well as to reduce the width of variations in the tension.

However, in the structure of the above conventional clamping mechanism, the timing (webbing tension) for shearing the holding portions 8c tends to vary according to the acting conditions (deceleration conditions) of the shocks occurring in a vehicle collision or the like, which makes it very difficult to correspond the timing for removing the webbing holding to the tension acting on the webbing, with the result that the shock absorbing performance as designed cannot be obtained.

There would be considered the causes of the above problem found in the conventional clamping mechanism as follows.

For example, as shown in FIG. 30, a shearing force $F_1$ due to the tension acting on the webbing 2 and a reaction force $F_2$ to a pressing force to the webbing 2 due to the swinging movement of the clamp holder 7 act on the holding portions 8c of the clamp member 8 pressed against the webbing 2. Actually, it is assumed that the resultant force $F_3$ of these two forces $F_1$ and $F_2$ provides a force to break the holding portions 8c. However, in the above conventional clamping mechanism, after the webbing is held, until the holding portions 8c are broken by the force $F_3$, the pressing operation due to the swinging movement of the clamp holder 7 continues, the force $F_2$ continues increasing according to an increase in the tension acting on the webbing 2. Further, the force $F_2$ varies in the increasing speed in accordance with the increasing speed of the tension and the like. Due to these facts, the force $F_2$ has a very great effect on the force $F_3$ at the time when the holding portions 8c are actually broken.

Also, in any of the above-mentioned conventional structures, after the webbing holding by the clamping mechanism is removed, as also shown in FIG. 25, since the increase and decrease of the tension are repeated over a short time, there is a fear that the tension acting on the seat belt may be increased and decreased abruptly and the variation width thereof may be large.

SUMMARY OF THE INVENTION

The present invention aims at eliminating the problems found in the above-mentioned conventional seat belt winding devices. Accordingly, it is an object of the present invention to provide a seat belt winding device which, after a webbing is held by a clamping mechanism, can control the increase and decrease in a tension acting on a seat belt to a gentle level and can reduce the variation width of the tension, thereby being able to reduce effectively shocks to be applied to an occupant from the seat belt in a vehicle collision or the like.

According to a first aspect of the present invention, there is provided a seat belt winding device with a clamping mechanism for directly holding a webbing in a vehicle emergency, providing: a retractor base; a lower plate fixed to the retractor base; a movable clamp member for holding a webbing between the lower plate and the clamp member, the clamp member including: a plurality of clamp teeth for clamping and engaging the webbing to a webbing opposing surface of the clamp member; a flat portion located on an opposite side of the webbing opposing surface; a rear edge located on a rear end of the flat portion; and a flat surface located in a front end of the clamp member; an upper plate for guiding the clamp member to a webbing holding position, the upper plate including: an inclined portion sliding on the flat portion of the clamp member; a guide portion extending from a front end of the inclined portion in parallel to the webbing; and a stopper portion coupled to a front end of the guide portion, the inclined portion and guide portion being deformed by the rear edge of the clamp member in accordance with a movement of the clamp member in a webbing draw-out direction when a load acting on the upper plate exceeds a predetermined value; a winding shaft rotatably supported by the retractor base; and a bobbin rotated integrally with the winding shaft, the bobbin including a plastically deforming member deformed by a load to be applied to the webbing on an outer periphery of the bobbin.

According to a second aspect of the present invention, there is provided a seat belt winding device with a clamping mechanism for directly holding a webbing in a vehicle emergency, providing: a retractor base; a lower plate fixed to the retractor base; a movable clamp member for holding a webbing between the lower plate and the clamp member, the clamp member including clamp teeth for clamping and engaging the webbing to a webbing opposing surface of the clamp member; an upper plate for guiding the clamp member to a webbing holding position; and a holding device for preventing a movement of the upper plate in a webbing draw-out direction, the holding device including a plastically deforming portion deformed in accordance with a movement of the clamp member in the webbing draw-out direction; a winding shaft rotatably supported by the retractor base; and a bobbin rotated integrally with the winding shaft, the bobbin including a plastically deforming member deformed by a load applied to the webbing on an outer periphery of the bobbin, in which the upper plate is fixed to the holding device and so structured that the plastically deforming portion of the holding device is plastically deformed in accordance with the movement of the clamp member in the webbing draw-out direction to move in the webbing draw-out direction while keeping the webbing holding force of the clamp member when a load acting on the holding device exceeds a predetermined value.

According to a third aspect of the present invention, there is provided a seat belt winding device with a clamping mechanism for directly holding a webbing in a vehicle emergency, providing: a retractor base; a winding shaft rotatably supported by the retractor base; and a bobbin rotated integrally with the winding shaft, the bobbin including a plastically deforming member respectively deformed due to a load applied to the webbing on an outer periphery of the bobbin, the clamping mechanism removing the holding of the webbing if a load acting on the webbing exceeds a predetermined value.

With the above-mentioned first to third aspects of the present invention, in the early stages of an emergency, the clamping mechanism holds the webbing therebetween through the clamp member to prevent the draw-out of the webbing. After the webbing is held, when the tension acting on the webbing increases and exceeds a predetermined value, then, at first, the plastic deformation of the clamp supporting device supporting the clamp member starts and the clamp member moves together with the webbing to absorb kinetic energy to be applied to the webbing from the occupant, thereby being able to control an increase in the tension acting on the webbing.

When the plastic deformation of the clamp supporting device is completed and the clamp member cannot be moved in the webbing draw-out direction any longer, the webbing holding is removed to allow the draw-out of the webbing. This prevents the webbing tension from increasing and exceeding a predetermined value.

Then, if the holding condition of the webbing by the clamping mechanism is removed, then, after the webbing is slightly tightened, the webbing tension acts on the plastically deforming member in the outer periphery of the winding shaft when the clamping mechanism removes the webbing holding condition, and the plastically deforming member starts to be deformed to such a degree that the then webbing tension does not increase or decrease, which results in the reduced winding diameter of the winding shaft. The reduced winding diameter allows the webbing to be drawn further and, at the same time, the consumption of the kinetic energy through the plastic deformation process of the plastically deforming members absorbs the kinetic energy acting on the occupant, thereby being able to control a decrease and an abrupt re-increase in the tension acting on the webbing after the clamping mechanism removes the webbing holding.

Also, in both of the clamp supporting device and plastically deforming members, plastic deformation is repeated by stages and, as a whole, more kinetic energy can be absorbed effectively on the seat belt winding device side.

BRIEF DESCRIPTION OF THE DRAWINGS

In the accompanying drawings:

FIG. 4 is a longitudinal section view of a second embodiment of a seat belt winding device according to the present invention;

DETAILED DESCRIPTION OF THE PREFERRED EMBODIMENTS

Figure 1:
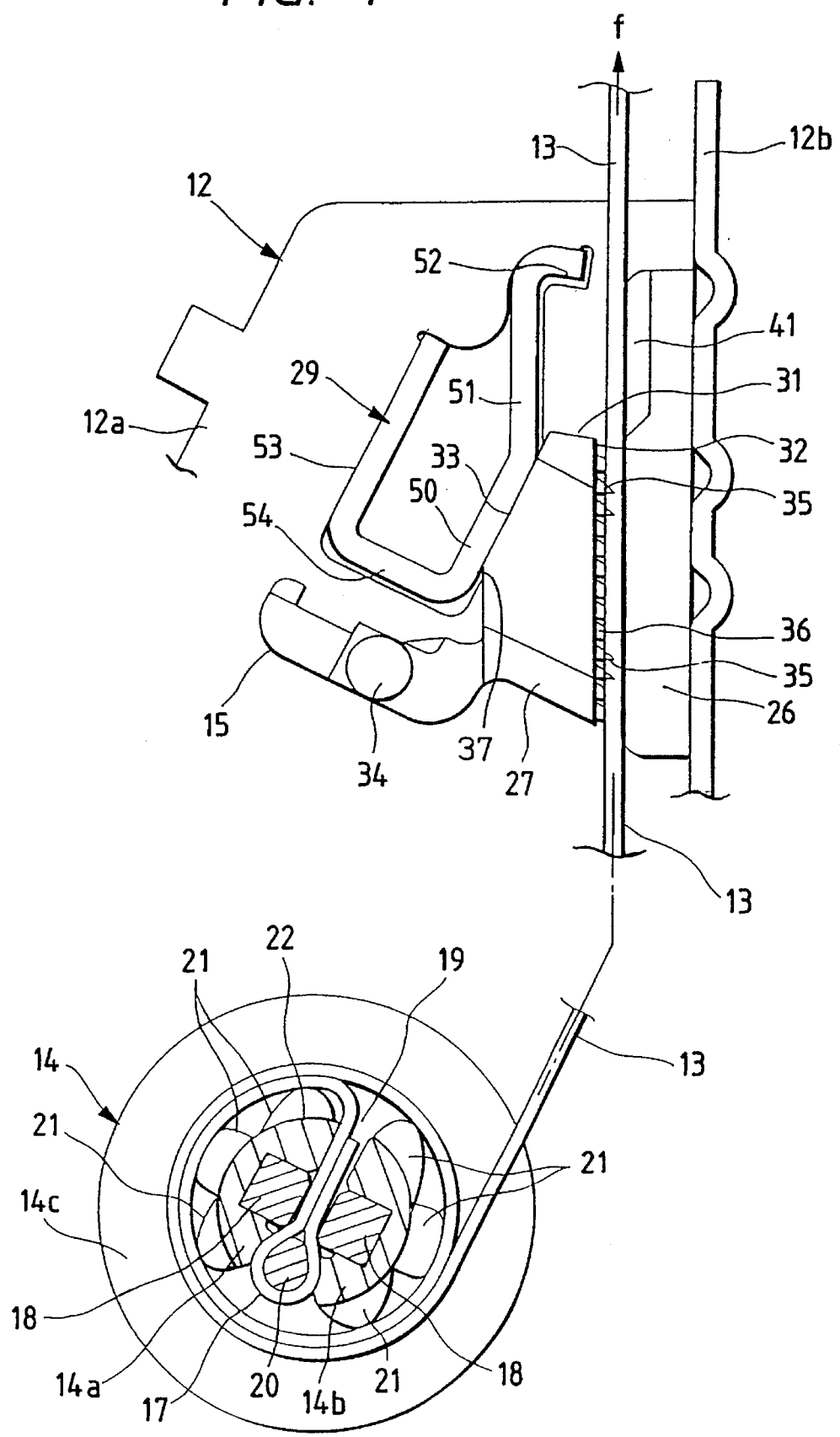
FIG. 1 is a longitudinal section view of a first embodiment of a seat belt winding device according to the present invention, showing a webbing holding condition.
Figure 2:
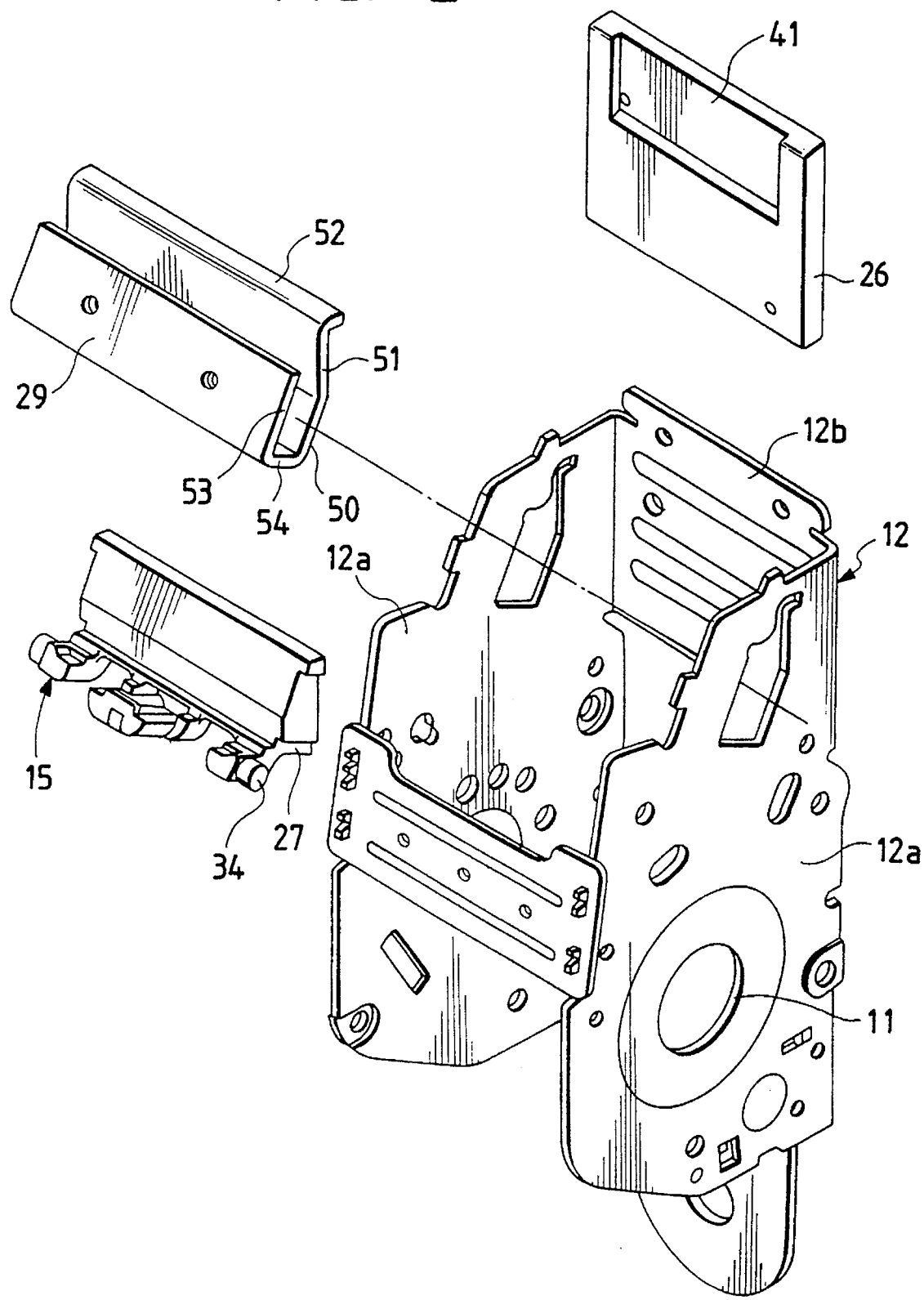
FIG. 2 is a perspective view of the whole structure of the first embodiment according to the present invention.
Figure 3:
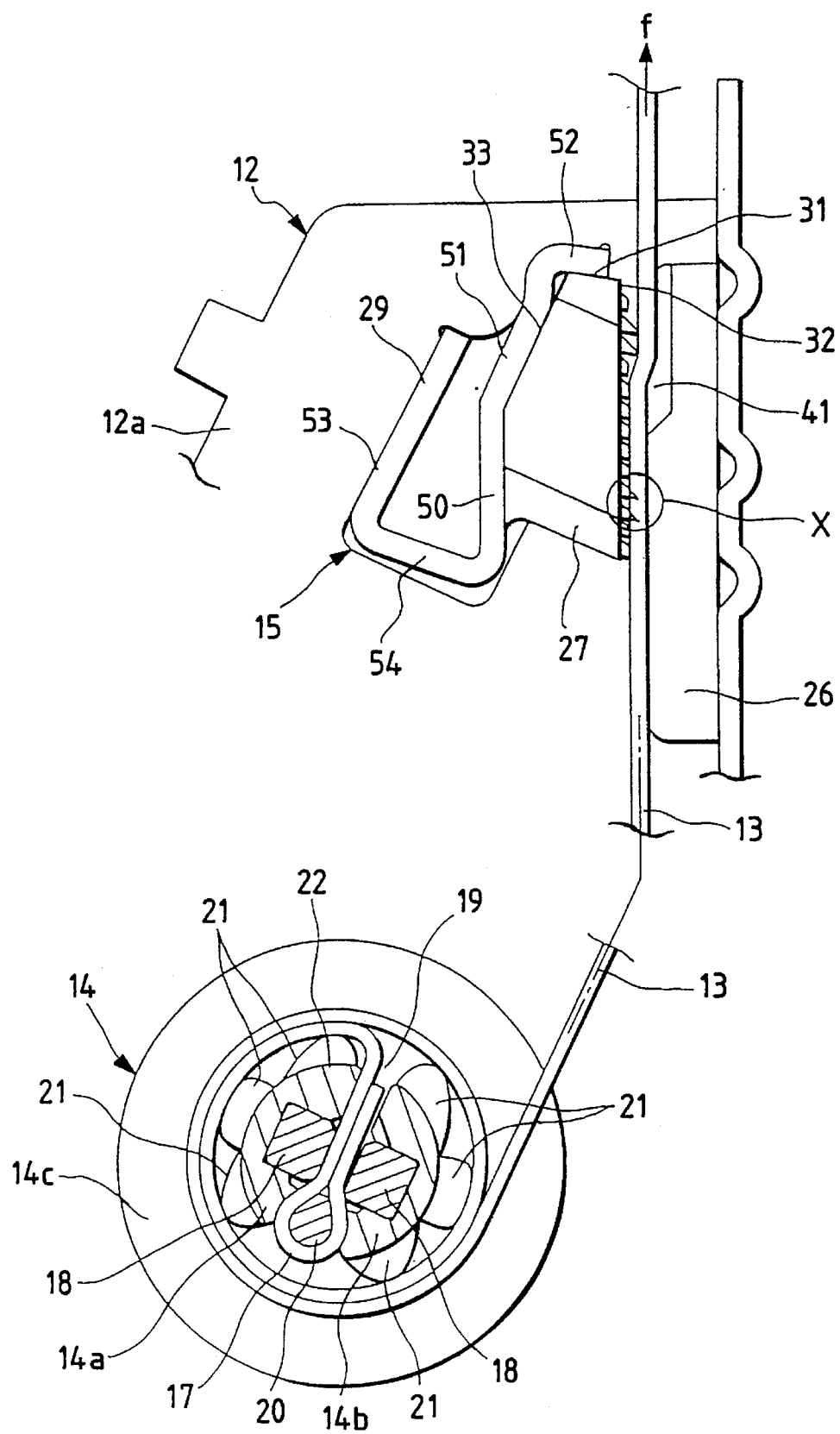
FIG. 3 is a longitudinal section view of the first embodiment, showing a state in which the webbing holding condition is removed.

FIGS. 1 to 3 show a first embodiment of a seat belt winding device according to the present invention. In particular, FIG. 1 is a longitudinal section view of the present seat belt winding device, showing a state in which a webbing is held by a clamping mechanism serving as a main part of the seat belt winding device, FIG. 2 is an exploded perspective view of the whole structure of the first embodiment, and FIG. 3 is a longitudinal section view of the present seat belt winding device, showing a state in which the webbing holding condition by the clamping mechanism, namely, one of the main portions of the first embodiment is removed.

The seat belt winding device according to the first embodiment is a so-called retractor with a clamping mechanism and provides a metal retractor base 12 including a pair of mutually opposing base side plates 12a and a base back plate portion 12b connecting the two base side plates 12a with each other and mountable onto a fixed structure (such as a vehicle body or the like) located on the seat side of a vehicle, a winding shaft 18 supported rotatably by the retractor base 12, a bobbin 14 supported by the retractor base 12 in such a manner that it can be rotated together with the winding shaft 18 and having a webbing 13 serving as a seat belt wound therearound, and a clamping mechanism 15, in an emergency such as a vehicle collision or the like, for holding the webbing 13 at a predetermined position along the base back plate 12b of the retractor base 12 to prevent the webbing 13 from being drawn out.

Here, the bobbin 14 with the webbing 13 wound therearound includes a pair of barrel portions 14a, 14b around which the webbing 13 is to be wound, and a disk-shaped flange portion 14c provided in the two ends of the barrel portions 14a, 14b. The bobbin 14 is rotatably supported in a pair of shaft support holes 11 (see FIG. 2) respectively formed in the two base side plates 12a through the winding shaft 18 extending through the central portions of the barrel portions 14a, 14b, and the bobbin 14 can be rotated integrally with the winding shaft 18. When the end portions of the webbing 13 are folded and sewed together, then there is provided a loop portion 17 through which a shaft member 20 (to be described later) can be inserted. The pair of barrel portions 14a, 14b of the bobbin 14 cooperate in defining a slit-like opening 19. The end portion of the webbing 13 is fixed by inserting the shaft member 20 (to be fixed to the bobbin 14) through the loop portion 17 inserted into the bobbin 14 from the opening 19.

Normally, on the end side of the winding shaft 18 supported rotatably by the retractor base 12, there is provided a winding spring device which energizes the bobbin 14 in the webbing winding direction. Also, on the other end side of the winding shaft 18, there is provided an emergency locking mechanism which detects the occurrence of an emergency from variations in speed due to a hard braking operation or due to a collision and engages a pawl with a ratchet provided integrally with the winding shaft 18 or bobbin 14, thereby preventing the bobbin 14 from being rotated in the webbing draw-out direction.

In the first embodiment, in the outer peripheries of the barrel portions 14a, 14b of the bobbin 14, as disclosed in U.S. Pat. No. 5,014,927, there are provided a large number of ribs 21 which respectively serve as plastically deforming memebers and also which can be deformed due to a load applied to the webbing 13 to reduce the winding diameter of the winding shaft 18 (that is, the substantial winding diameter of the bobbin 14) to allow the webbing 13 to be drawn out.

The ribs 21 are provided on the outer peripheral surface 22 of the inner peripheral side of the bobbin 14 and project outwardly in the radial direction of the bobbin 14 in such a manner that they are spaced apart a predetermined distance from one another.

The ribs 21 are respectively formed in a thin plate which is formed of metal such as aluminum, aluminum alloy or the like, or synthetic resin. When a tension acting on the webbing 13 increases and exceeds a predetermined value, then the ribs 21 are compressed and deformed (plastically deformed) due to a tightening force produced at the time to reduce the substantial winding diameter of the webbing 13. That is, after a clamping mechanism 15 (to be described later) removes the restraint of the draw-out of the webbing 13 held or clamped by the clamping mechanism 15, the ribs 21 are plastically deformed to draw out the webbing 13. With further reference to the plastic deformation of the ribs 21, the strengths of the ribs 21 can also be set in such a manner that, while maintaining substantially the webbing tension acting on the webbing 13 at the time of the clamping removal, the ribs 21 can be deformed.

The clamping mechanism 15 is used to prevent the draw-out of the webbing 13 due to the tightening of the webbing 13 left wound around the bobbin 14. As shown in FIGS. 1 and 2, the clamping mechanism 15 includes a lower plate 26 fixed at a predetermined position on the base back plate portion 12b of the retractor base 12, a clamp member 27 including a large number of clamp teeth which can be pressed against and engaged with the webbing 13, a clamp lever (not shown) for holding the clamp member 27 and, in an emergency, for moving the clamp member 27, an upper plate 29, when the clamp lever moves the clamp member 27, for guiding the clamp member 27 such that the clamp member 27 can press against the webbing 13 properly, and an upper stay (not shown) for fixing the upper plate 29 to the base side plates portion 12a of the retractor base 12.

As shown in FIG. 1, the clamp member 27 includes a flat surface 31 formed in the front end portion thereof, a webbing opposing surface 32 having a plurality of clamp teeth which can be pressed against the webbing 13 and thus can be clamped and engaged with the webbing 13, a flat portion 33 situated on the opposite side to the webbing opposing surface 32 and slidable on the sliding surface of the upper plate 29, and a rear end side edge 37 formed on the rear end side of the flat portion 33, while a pivot 34 mounted on the rear end side of the clamp member 27 is rotatably supported by the above-mentioned clamp lever (not shown). Further, on the webbing opposing surface 32 of the clamp member 27, there are projectingly formed two kinds of clamp teeth: a proper number of first clamp teeth 35 each having a sharpened end; and a proper number of second clamp teeth 36 each having a flat end.

Further, as shown in FIG. 1, the first clamp teeth 35 stick into the webbing 13 with their respective sharpened end portions to prevent the draw-out of the webbing 13, while the second clamp teeth 36 press their respective flat end faces against the surface of the webbing 13 to hold the webbing 13 between the lower plate 26 and itself to prevent the draw-out of the webbing 13.

Also, in the present embodiment, the first clamp teeth 35 are arranged in two rows respectively front and behind the webbing opposing surface 32 of the clamp member 27, that is, a total of four rows.

The clamp lever (not shown), which is used to move the clamp member 27 in an emergency, is supported swingably about a shaft provided between the pair of base side plates 12a of the retractor base 12 and holds the pivot 34 of the clamp member 27 in the end portion of the clamp lever. The clamp lever operates in linking with the above-mentioned emergency locking mechanism (not shown). In particular, in an emergency in which the emergency locking mechanism prevents the rotation of the bobbin 14 in the webbing draw-out direction, the clamp lever swings to press the clamp member 27 into under the upper plate 29 and thus press the clamp member 27 against the webbing 13 under the guidance of the upper plate 29 to prevent the draw-out of the webbing 13. Also, the clamp lever, normally, energizes the clamp lever 27 in a direction opposite to a direction to press the clamp lever 27 into under the upper plate 29 by a return spring (not shown) provided on the back surface side of the upper plate 29, in order to prevent the clamp member 27 from coming into contact with the webbing 13.

The upper plate 29 is formed by bending a metal plate and, as shown in FIG. 1, includes an inclined portion 50 which, in an emergency, comes into sliding contact with the flat portion 33 of the clamp member 27 pushed out by the clamp lever to guide the clamp member 27 to the webbing 13 side, a guide portion 51 extending from the front end of the inclined portion 50 in parallel to the webbing 13, a stopper portion 52 coupling to the front end of the guide portion 51 and contactable with the flat surface 31 of the clamp member 27 to prevent the clamp member 27 from moving in the webbing draw-out direction, a fixed portion 53 to be fixed to the retractor base 12 through the upper stay, and a connecting portion 54 connecting the fixed portion 53 with the rear end of the inclined portion 50.

The strengths and dimensions of the inclined portion 50 and guide portion 51 are designed such that, after the clamp member 27 holds the webbing 13, if the load acting on the upper plate 29 reaches a predetermined value (a first specific value) $f_1$ due to an increase in the tensile force acting on the webbing 13 and thus, as shown in FIG. 3, the rear end side edge 37 of the clamp member 27 operates to bend the inclined portion 50 inwardly of the upper plate 29, then the inclined portion 50 and guide portion 51 can be plastically deformed to permit movement of the clamp member 27 in the webbing draw-out direction, thereby preventing an increase in the tensile force acting on the webbing 13 to absorb the kinetic energy acting on the body of the occupant. If the clamp member 27 is moved by a predetermined amount in the webbing draw-out direction, then the stopper portion 52 is brought into contact with the flat surface 31 provided in the front end portion of the clamp member 27 to prevent the clamp member 27 from moving in the webbing draw-out direction.

In this case, the upper plate 29 functions as a clamp supporting device. That is, the upper plate 29 not only supports the clamp member 27 holding the webbing 13 but also is plastically deformed under a load lower than a force to shear or deform the first clamp teeth 35 to allow the clamp member 27 to move a predetermined amount in the webbing draw-out direction.

On the other hand, on the upper surface of the front end side of the lower plate 26 for realizing the webbing holding in cooperation with the clamp member 27, there is formed a webbing escaping recess 41 which, on completion of the movement of the clamp member 27 due to the plastic deformation of the inclined portion 50 and guide portion 51 of the upper plate 29, as shown in FIG. 3, allows the webbing 13 to escape in order that the webbing 13 can be disengaged from a predetermined number of first clamp teeth 35 out of a plurality of first clamp teeth 35 sticking to the webbing 13. That is, the remaining number of first clamp teeth 35 not corresponding to the webbing escaping recess 41 can be sheared or deformed to remove the webbing holding.

Also, a load (a second specific value) $f_2$ to start the plastic deformation of the ribs 21 of the bobbin 14 is preferably equal to the first specific value $f_1$ but is not limited to this.

Next, description will be given below of the operation of the first embodiment of a seat belt winding device according to the present invention. In an emergency in which an abrupt deceleration occurs due to a vehicle collision or the like, the clamping mechanism 15 operates in linking with the operation of the emergency locking mechanism which prevents the rotation of the bobbin. In the early stages of the webbing holding by the clamping mechanism 15, as shown in FIG. 1, all of the first clamp teeth 35 provided on the clamp member 27 hold the webbing positively to prevent the draw-out of the webbing. After the webbing is held, if the tension acting on the webbing increases and thus the load acting on the inclined portion 50 of the upper plate 29 increases and exceeds the first specific value $f_1$, then, as shown in FIG. 3, the inclined portion 50 and guide portion 51 of the upper plate 29 start to be deformed plastically and thus the clamp member 27 holding the webbing is allowed to move, whereby the kinetic energy to be applied to the webbing from the occupant can be absorbed to prevent an increase in the tension acting on the webbing. Here, when the clamp member 27 is moved, the rear end portion of the clamp member 27 mounting the pivot 34 thereon is broken by the upper plate 29.

As shown in FIG. 3, when the plastic deformation of the upper plate 29 is completed and the clamp member 27 is prevented from moving in the webbing draw-out direction, then the first clamp teeth 35 are in part situated in the webbing escaping recess 41 and the number of the first clamp teeth 35 securing the webbing is reduced down substantially to one half, so that the webbing securing strength of the first clamp teeth 35 is lowered and thus the first clamp teeth 35 are sheared or deformed to permit draw-out of the webbing.

Then, if the draw-out of the webbing due to the shear or deformation of the first clamp teeth 35 starts, then the webbing is tightened on the bobbin 14 side. This tightening starts the compressive deformation of the ribs 21, which in turn further reduces the substantial winding diameter of the barrel portion of the bobbin, with the result that the webbing is further drawn out.

The compressive deformation of the ribs 21 can absorb the kinetic energy further and, more preferably, for example, if the strength of the rib 21 is set in such a manner that the webbing tension in deformation can be kept substantially constant, then the kinetic energy can be consumed more effectively in the compressive deformation process.

Figure 25:
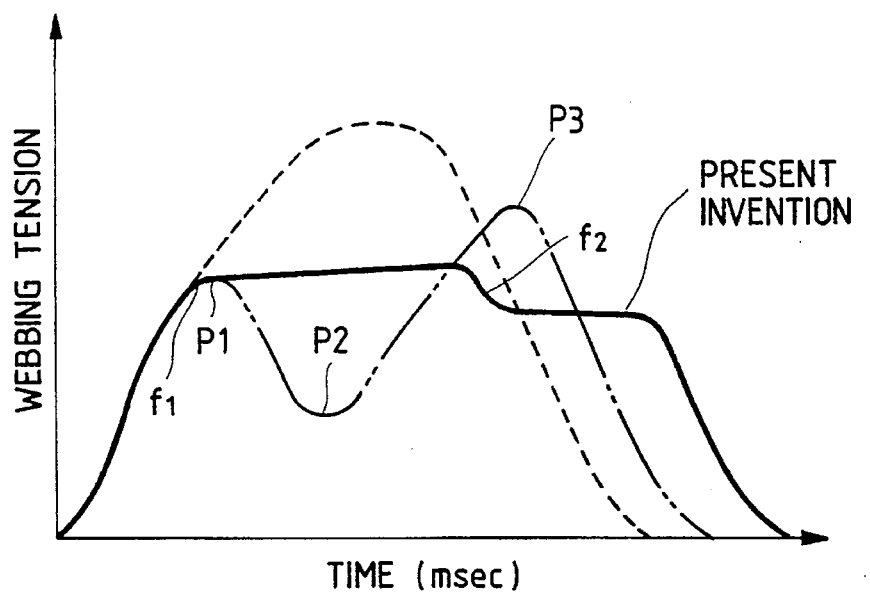
FIG. 25 is a graphical representation of variations in the tension of a seat belt in accordance with passage of time after a collision is occurred.
Figure 26:
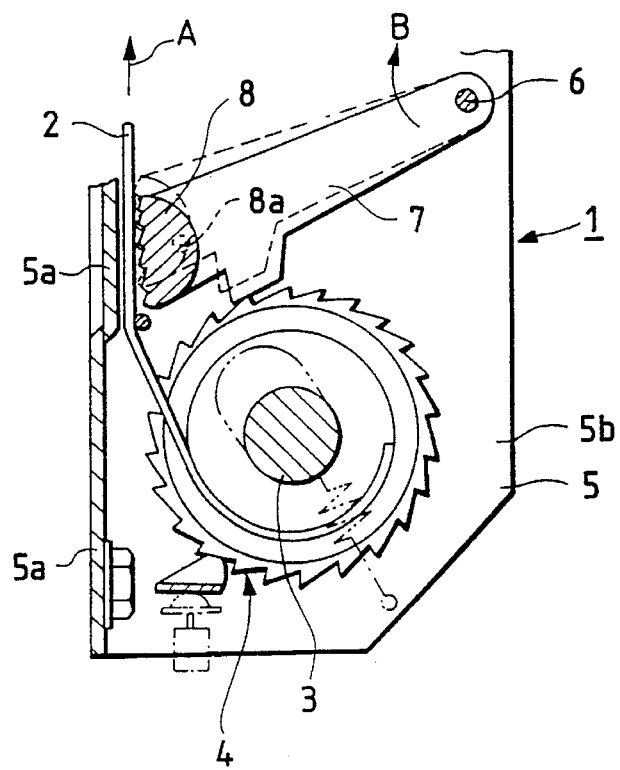
FIG. 26 is a schematic structure view of a conventional seat belt winding device.
Figure 27:
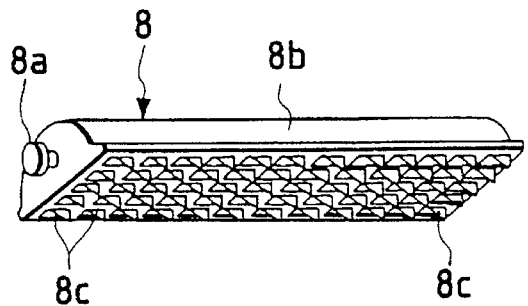
FIG. 27 is a perspective view of a clamp member employed in a conventional clamping mechanism.
Figure 28:
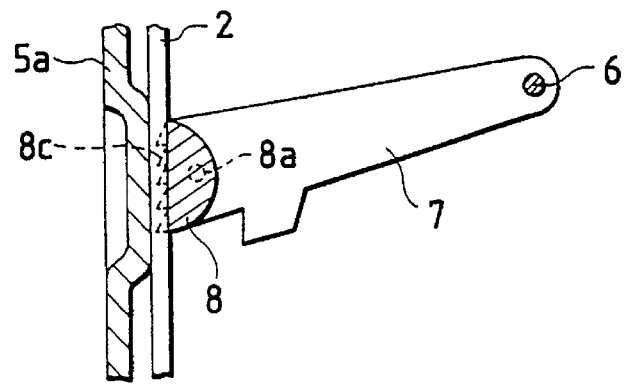
FIG. 28 is an explanatory view of a webbing holding condition by the conventional clamping mechanism.
Figure 29:
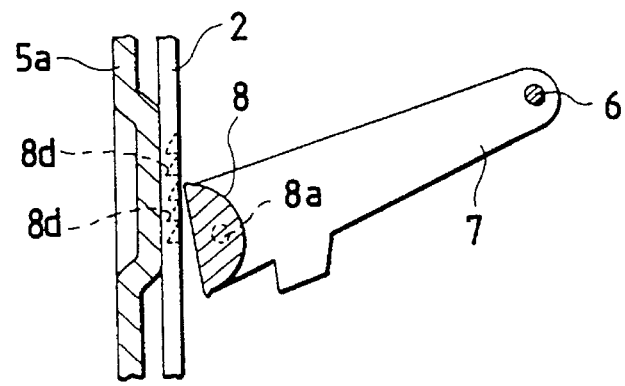
FIG. 29 is an explanatory view of a webbing holding removing condition by the conventional clamping mechanism.
Figure 30:
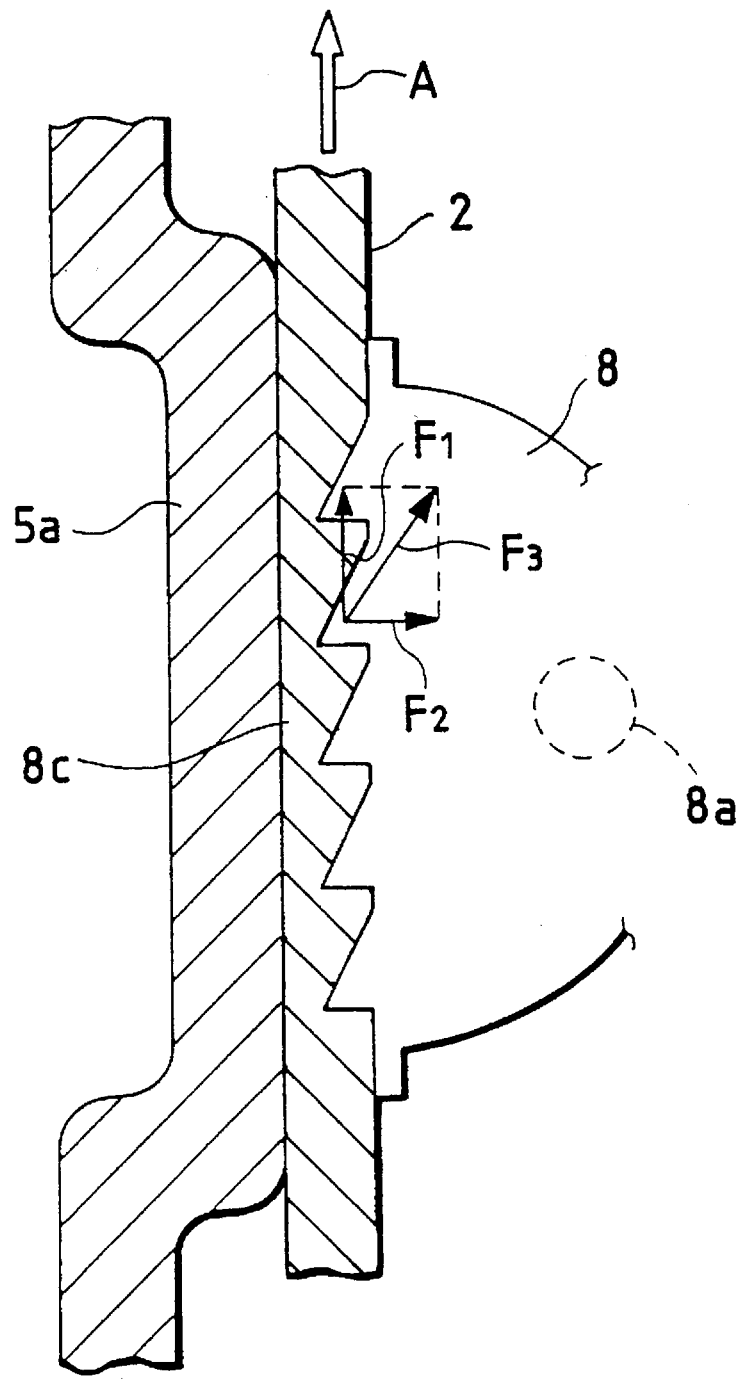
FIG. 30 is an explanatory view of a force acting on a clamp member of a clamping mechanism.

As described above, in the first embodiment, the tensile force acting on the webbing 13 shows such a smooth variation characteristic as shown by a solid line in FIG. 25. That is, due to the plastic deformation of the upper plate 29 serving as the clamp supporting device as well as due to the plastic deformation of the ribs 21, the effective absorption of the kinetic energy is repeated in stages and for a longer period of time to allow the seat belt winding device to absorb a larger amount of kinetic energy quickly without making larger the damage to be applied to the occupant body, which can control the increase and decrease in the tensile force acting on the seat belt after the webbing holding to a gentle level and can also reduce the variation width of the tensile force, thereby being able to reduce effectively and greatly the shocks to be applied to the occupant from the seat belt in a vehicle collision and the like.

Further, the amount of draw-out of the webbing 13 can be set larger according to the characteristics of the types of the vehicles carrying the seat belt winding device. Therefore, the amount of draw-out of the webbing 13 after the holding of the webbing is removed in an emergency can be set to the optimum value, so that the protection function of the seat belt winding device can be fulfilled extremely effectively.

Figure 4:
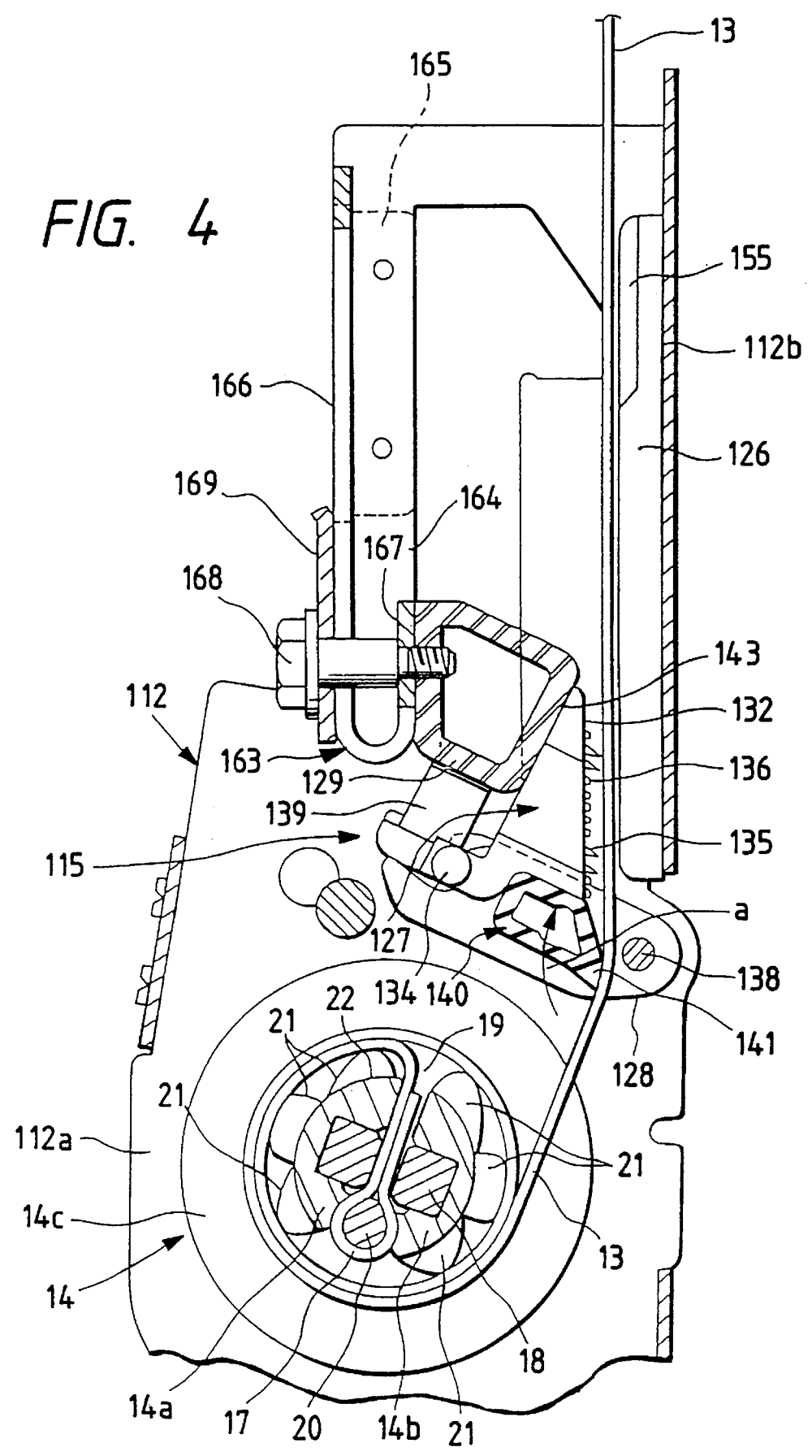
Figure 5:
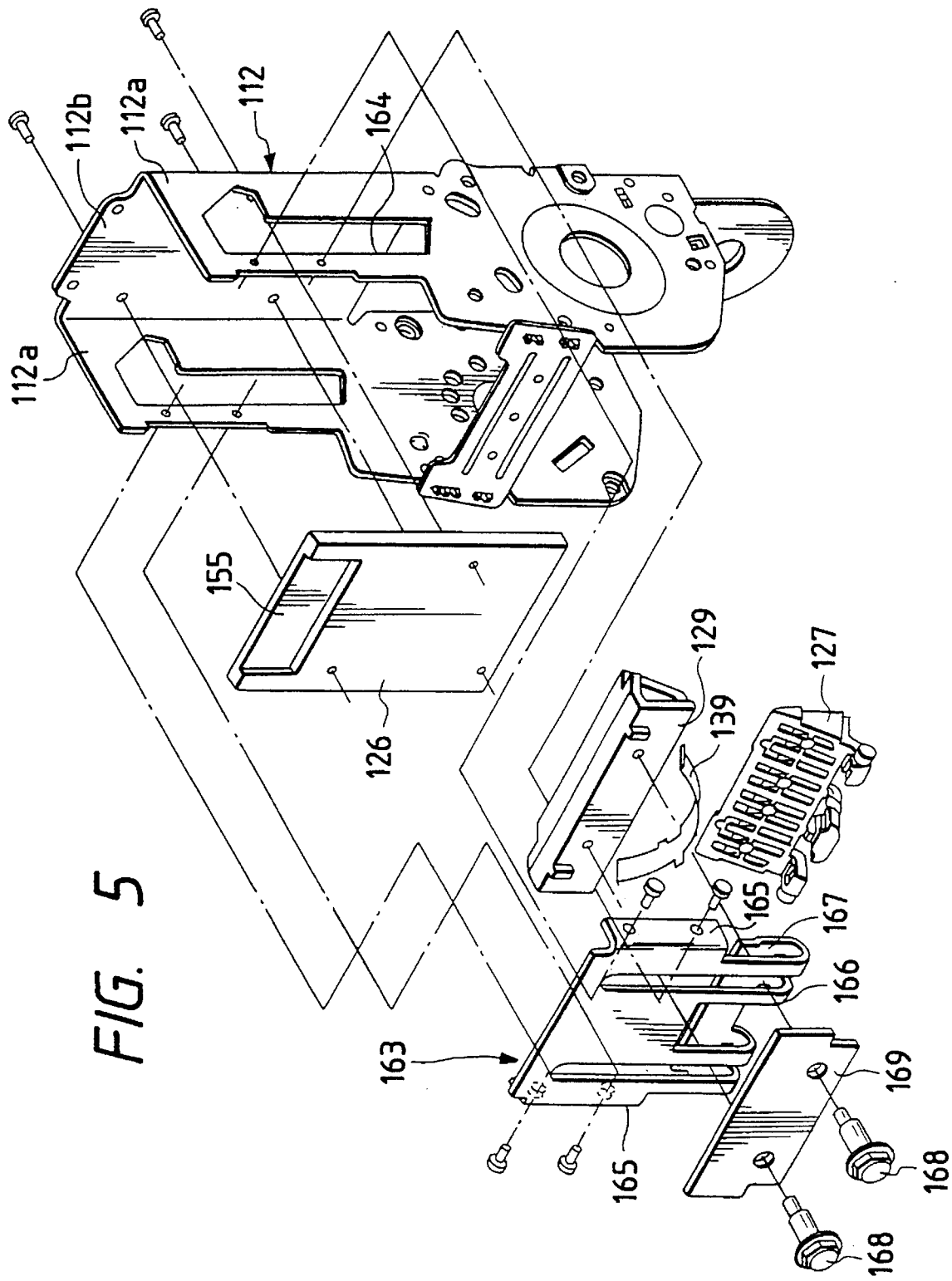
FIG. 5 is a perspective view of the whole structure of the second embodiment according to the present invention.
Figure 6:
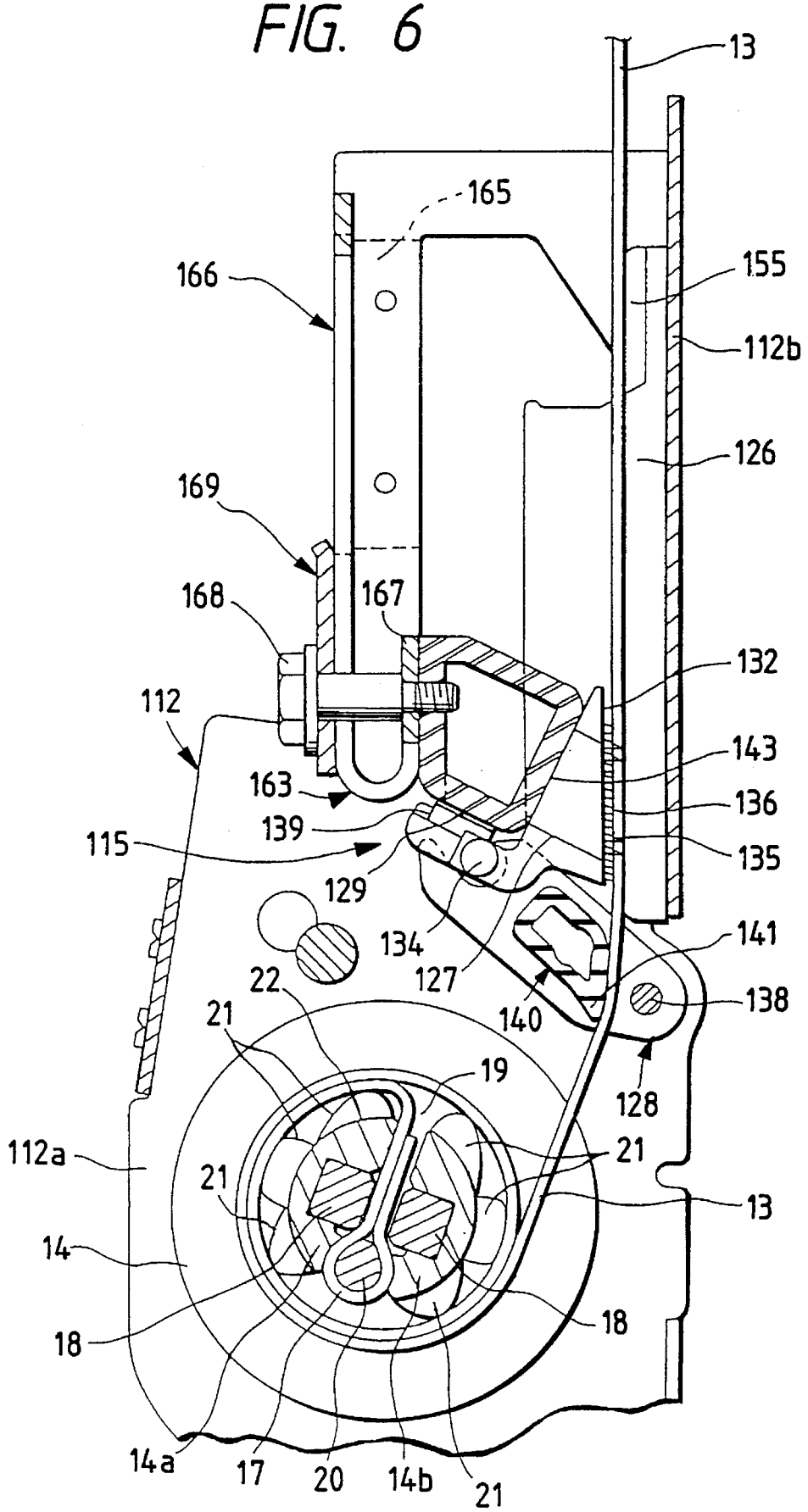
FIG. 6 is a longitudinal section view of the second embodiment according to the present invention, showing its webbing holding condition.
Figure 7:
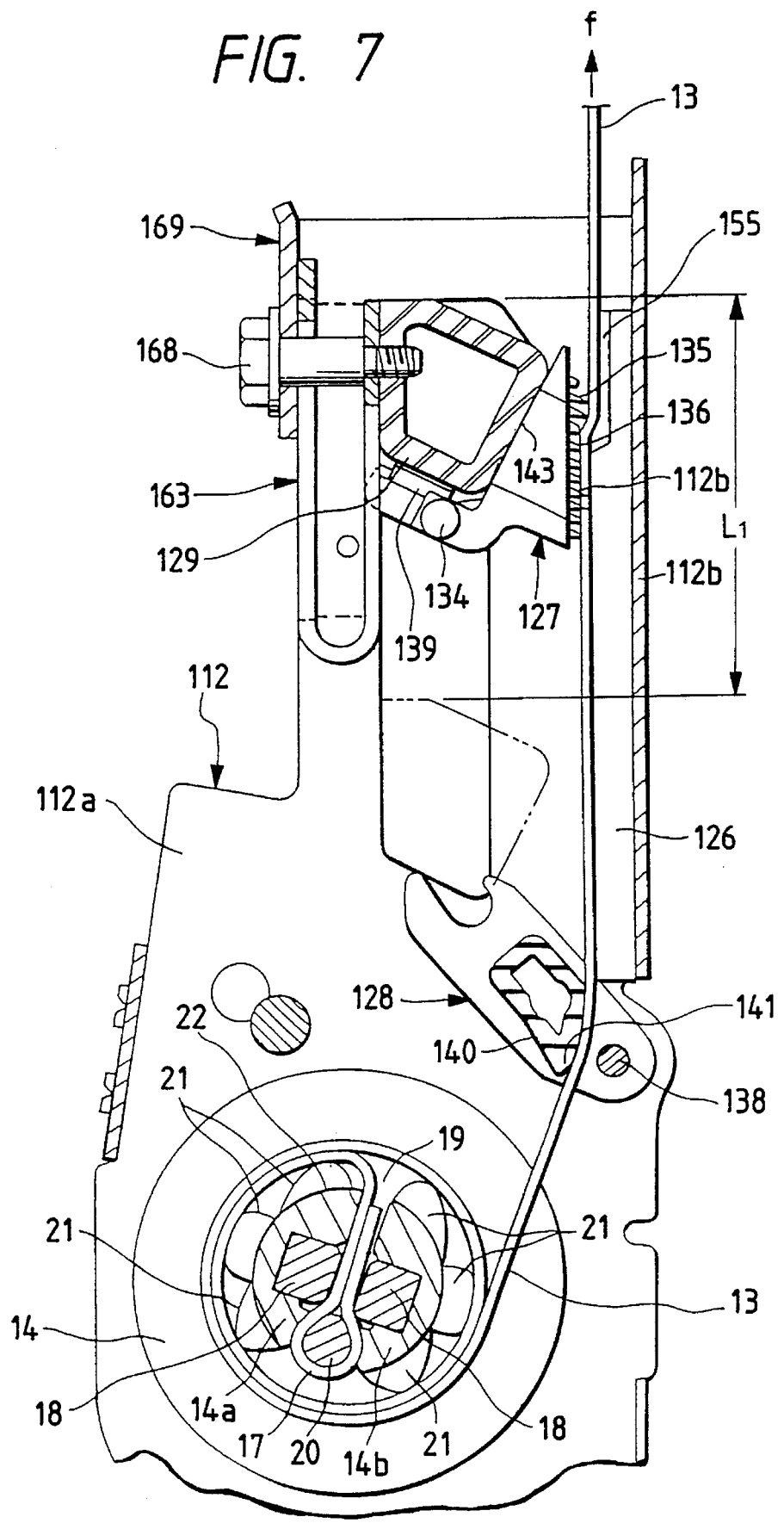
FIG. 7 is a longitudinal section view of the second embodiment, showing a state in which the webbing holding condition is removed.

FIGS. 4 to 7 show a second embodiment of a seat belt winding device according to the present invention. In particular, FIG. 4 is a longitudinal section view of the second embodiment, FIG. 5 is an exploded perspective view of the schematic structure of the whole device, FIG. 6 is a longitudinal section view of the second embodiment, showing a state in which a webbing is held by a clamping mechanism 115 employed in the second embodiment, and, FIG. 7 is a longitudinal section view of the second embodiment, showing a state in which the webbing holding condition is removed.

The seat belt winding device according to the second embodiment provides a retractor base 112 including a pair of mutually opposing base side plates 112*a* and a base back plate portion 112*b* connecting the pair of base side plates 112*a* with each other, a bobbin 14 supported rotatably by the retractor base 112 and having a webbing 13 wound therearound, and a clamping mechanism 115, in an emergency such as a vehicle collision and the like, for holding the webbing 13 at a predetermined position existing along the base back plate 112*b* of the retractor base 112 to prevent the webbing 13 from being drawn out.

The clamping mechanism 115 includes a lower plate 126 fixed at a predetermined position on the base back plate 112*b* of the retractor base 112, a clamp member 127 having a large number of clamp teeth to be pressed against the webbing 13, a clamp lever 128 for holding the clamp member 127 and, in an emergency, for moving the clamp member 127, an upper plate 129, when the clamp lever 128 moves the clamp member 127, for guiding the clamp member 127 in such a manner that the clamp member 127 can push against the webbing 13 appropriately, and an upper stay 163 serving as a hold member forming a holding device which regulates the movement of the upper plate 129 in the webbing draw-out direction.

The clamping mechanism 115 according to the second embodiment is greatly different from that of the first embodiment in that, instead of the upper plate 129, the upper stay 163 can be deformed plastically.

Next, description will be provided below in sequence of the structure in FIGS. 4 to 7. However, since the structure of the bobbin 14, the structure of the ribs 21 formed in the outer periphery of the bobbin 14, and a winding spring device and an emergency locking mechanism respectively provided on the winding shaft 18 are all similar to those employed in the first embodiment, further description is omitted here.

The clamp member 127 is different from the clamp member 27 employed in the first embodiment in that the clamp member 127 does not have a flat surface 31 provided in the clamp member 27 but has a wedge-like shape as a whole, but the clamp member 127 is similar to the clamp member 27 in the remaining portions. That is, on the webbing opposing surface 132 of the clamp member 127 to be pressed against the webbing 13, the above-mentioned first clamp teeth 135 and second clamp teeth 136 are similarly arranged. Further, on the rear end side of the clamp member 127, there is provided a pivot 134 to be supported by the clamp lever 128.

The clamp lever 128 is supported in such a manner that it can be swung about a shaft 138 provided between the pair of base side plates 112*a* of the retractor base 112, and the clamp lever 128 holds the pivot 134 of the clamp member 127 in the end portion of the clamp lever 128. The clamp lever 128 is so arranged as to operate in linking with the above-mentioned emergency locking mechanism (not shown); that is, in an emergency in which the emergency locking mechanism prevents the bobbin 14 from rotating in the webbing draw-out direction, the clamp lever 128 swings in a direction of an arrow a to press the clamp member 127 against the webbing 13 and hold the webbing 13 between the lower plate 126 and clamp member 127, thereby preventing the draw-out of the webbing 13. Also, the clamp lever 128 is normally energized in the opposite direction to the arrow a direction by a return spring 139 provided on the back surface side of the upper plate 129, in order to eliminate the possibility that the clamp member 127 can come into contact with the webbing 13. Further, the clamp lever 128 includes thereon a connecting portion 140 having a deformed section which is so arranged as to be contactable with the rear end face of the clamp member 127, in order to prevent the webbing draw-out position from the bobbin 14 from varying according to the winding diameters (remaining amounts) of the webbing on the bobbin 14. That is, the connecting portion 140 contacts its one end portion 141, which is formed in a smoothly curved surface, with the webbing 13 to restrict the webbing draw-out position.

The upper plate 129 is fixed by a screw to the plate support portion 167 of the upper stay 163 and is supported by two guide grooves 164 (see FIG. 5) respectively formed in the base side plates 112*a* along the base back plate portion 112*b* in such a manner that the upper plate 129 is freely movable in the webbing 13 draw-out direction.

On the other hand, the upper stay 163 is formed by bending a metal plate into a predetermined shape. The upper stay 163 includes two wall portions 165 which are respectively formed in its two side edges in the width direction of the upper stay 163 and are to be fixed to the base side plates 112*a* by screws, two plastically deforming portions 166 respectively coupling to the two side wall portions 165 and having a U-shaped longitudinal section, and two plate support portions 167 respectively situated on one end side of the plastically deforming portions 166 for screwing the upper plate 129. A male screw member 168 is used to fix the upper plate 129 to the plate support portions 167 and, on the male screw member 129, there is mounted a metal washer 169 which can be slidably contacted with the upper surfaces of the plastically deforming portions 166 to prevent corrugated deformation of the plastically deforming portions 166 when they are deformed plastically, and also which guides the plastically deforming portions 166 to be deformed smoothly.

The material, and shapes and dimensions in the radius of curvature of the U-shaped curved portion of the plastically deforming portions 166 are selected in such a manner that, when the tension acting on the webbing 13 increases and thus the load acting on the plate support portions 167 through the clamp member 127 and upper plate 129 reaches the above-mentioned first specific value $f_1$, then the plastically deforming portions 166 can be deformed plastically in accordance with the movement of the clamp member 127 in the webbing draw-out direction.

According to the second embodiment, in a normal driving operation or the like in which an abrupt deceleration due to a vehicle collision or the like does not occur, as shown in FIG. 4, the clamp member 127 is kept spaced apart from the webbing 13 by the return spring 139 or the like.

However, in an emergency in which an abrupt deceleration due to a vehicle collision or the like occurs, the clamp lever 128 is rotated in the arrow a direction in linking with the operation of the emergency locking mechanism for preventing the rotation of the bobbin 14 and pushes out the clamp member 127 along the sliding contact surface 143 of the upper plate 129 to, as shown, in FIG. 6, press the first and second clamp teeth 135 and 136 of the clamp member 127 against the webbing 13, thereby preventing the webbing 13 from being drawn out due to tightening of the webbing 13.

After the draw-out of the webbing is prevented, in the above-mentioned clamp condition, if a tension exceeding a predetermined value acts on the webbing 13 and, as a result, the load acting on the upper stay 163 reaches the above-mentioned first specific value $f_1$, then the clamp member 127, while maintaining the webbing holding force, moves the plate support portions 167 together with the upper plate 129 upwardly of the retractor and thus a bending force acting on the plastically deforming portions 166 of the upper stay 163 increases and exceeds a predetermined value. As a result with the movement of the clamp member 127 in the webbing draw-out direction, the upper plate 129 causes its plastically deforming portions 166 to be bent (deformed plastically), which allows the plate support portions 167 to be moved in the webbing draw-out direction.

The movement of the plate support portions 167 in the webbing draw-out direction provides the movements of the upper plate 129 and clamp member 127 in the webbing draw-out direction, which allows the webbing 13 to be drawn out. Therefore, the kinetic energy acting on the webbing can be absorbed by the plastically deforming portions 166 according to the amount of draw-out of the webbing to thereby be able to reduce the shocks to be applied to the body of the occupant from the webbing.

As shown in FIG. 7, in a state in which the plastic deformation of the upper stay 163 is completed (in FIG. 7, when the movement of a stroke $L_1$ is completed), the first clamp teeth 135 formed on the front end side of the clamp member 127, similarly to the first embodiment, are removed from engagement with the webbing 13 due to a webbing escaping recess 155 formed in the lower plate 126.

Therefore, only the first clamp teeth 135 on the rear end side of the clamp member 127 remaining engaged with the webbing are sheared or deformed to reduce the tensile force acting on the webbing as well as absorb the kinetic energy acting on the webbing.

After the webbing holding is removed due to the shear or deformation of the first clamp teeth 135, similarly to the first embodiment, with the progress of the webbing tightening, the ribs 21 provided in the outer periphery of the bobbin 14 start to be deformed plastically due to the load acting on the ribs 21, so that the substantial winding diameter of the bobbin 14 is reduced. This not only allows the further draw-out of the webbing but also can lessen the shocks to be applied to the occupant due to the kinetic energy absorbing action in the plastic deformation process of the ribs 21.

Figure 20:
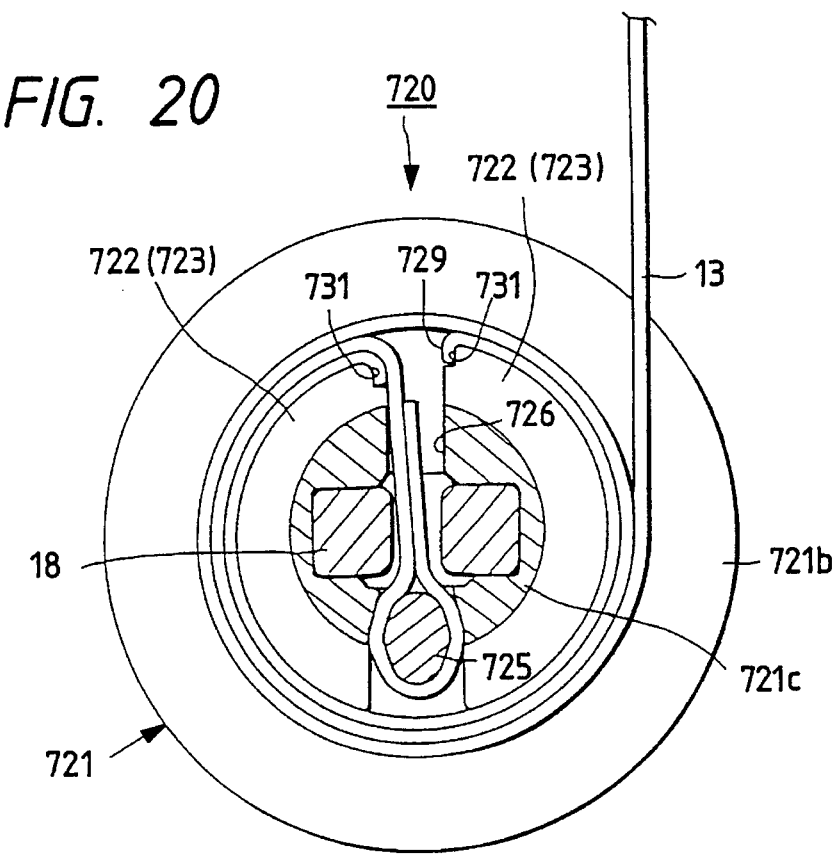
FIG. 20 is a section view of the main portions of a winding mechanism employed in an eighth embodiment of a seat belt winding device according to the present invention.

As described above, even when the upper stay 163 is so structured that it can be plastically deformed at the first specific value $f_1$, the tensile force acting on the webbing 13 provides such a characteristic as shown by a solid line in FIG. 20 and thus a similar operation effect to the first embodiment can be obtained.

Figure 8:
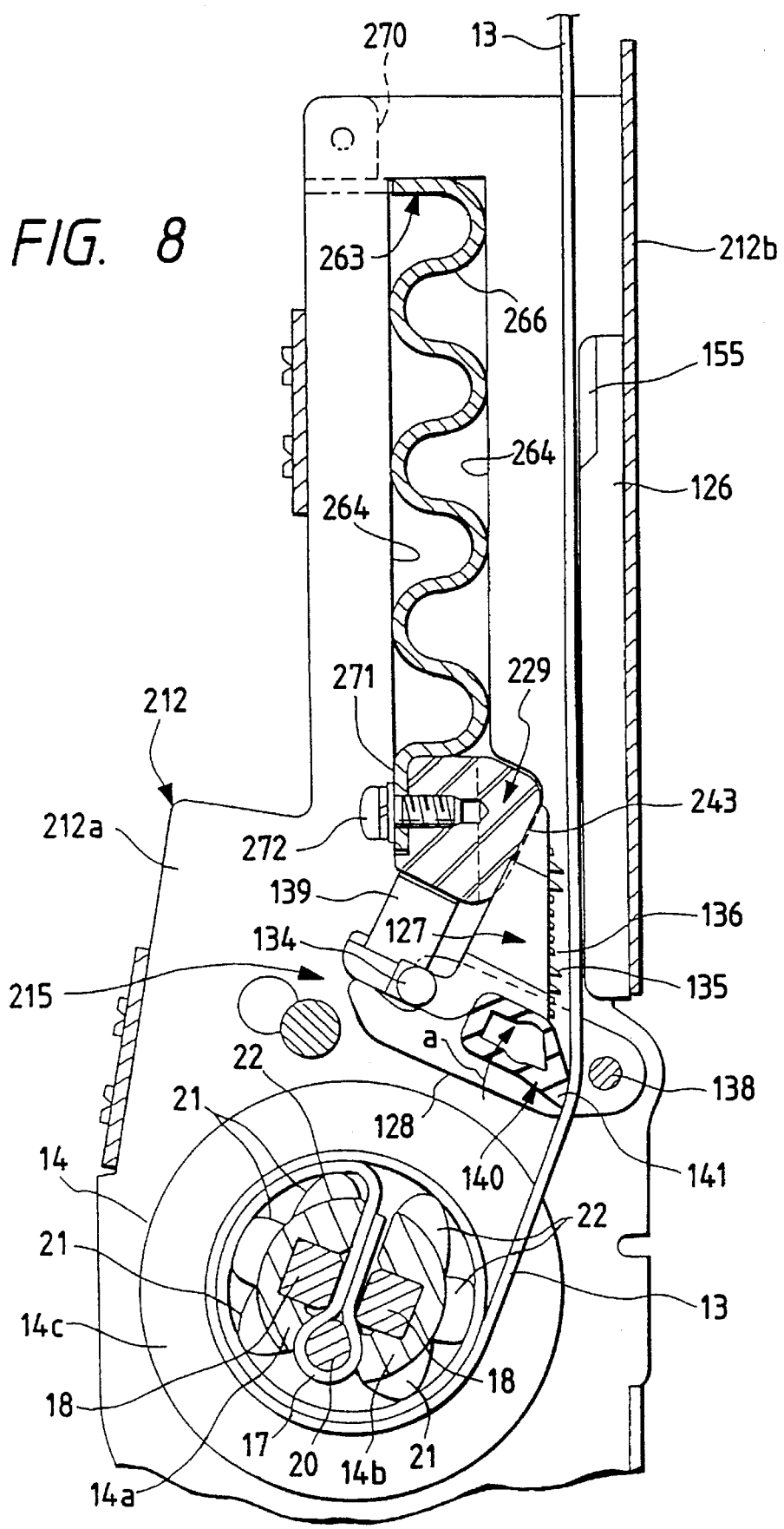
FIG. 8 is a longitudinal section view of a third embodiment of a seat belt winding device according to the present invention.
Figure 9:
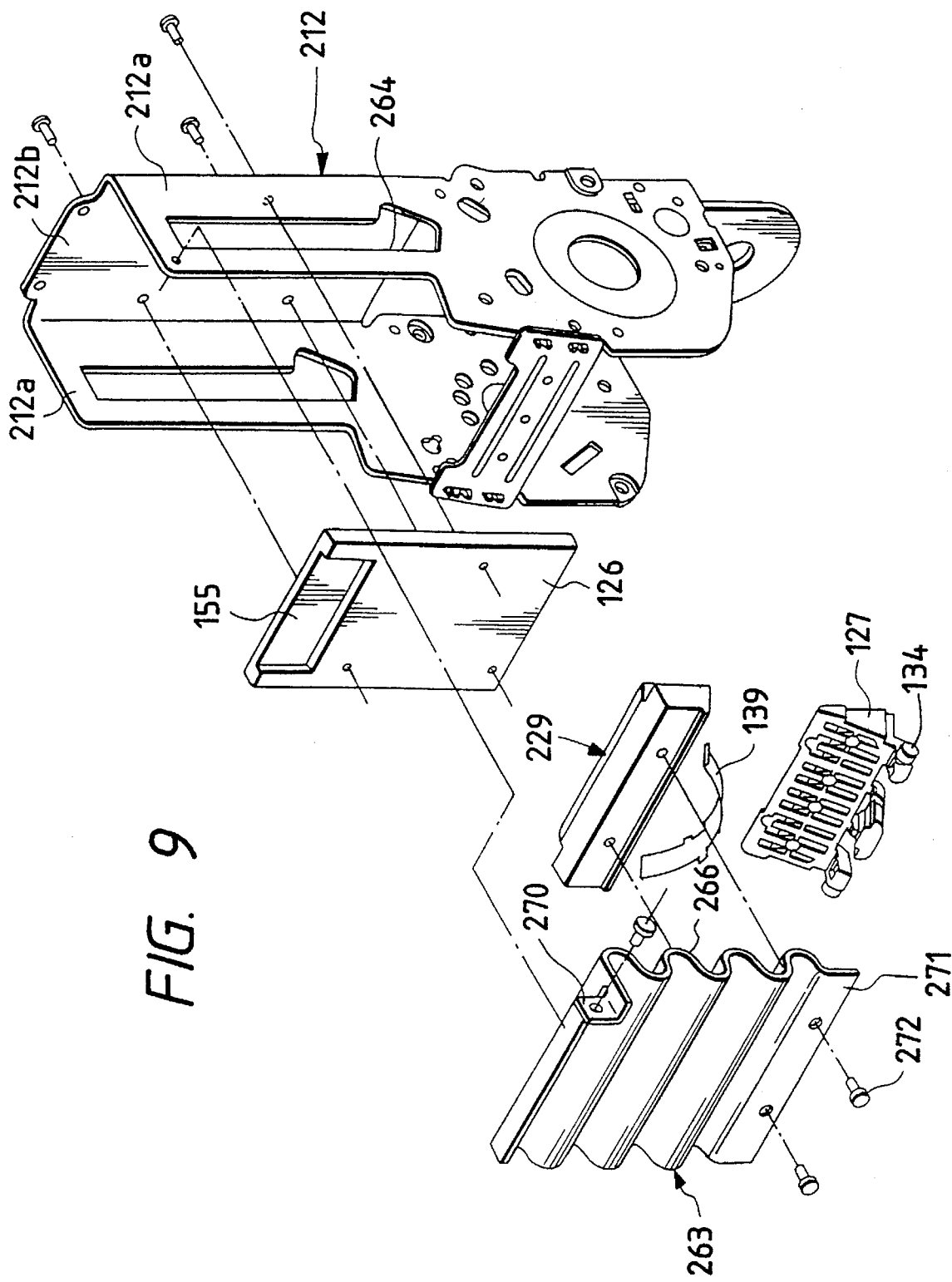
FIG. 9 is a perspective view of the whole structure of the third embodiment according to the present invention.
Figure 10:
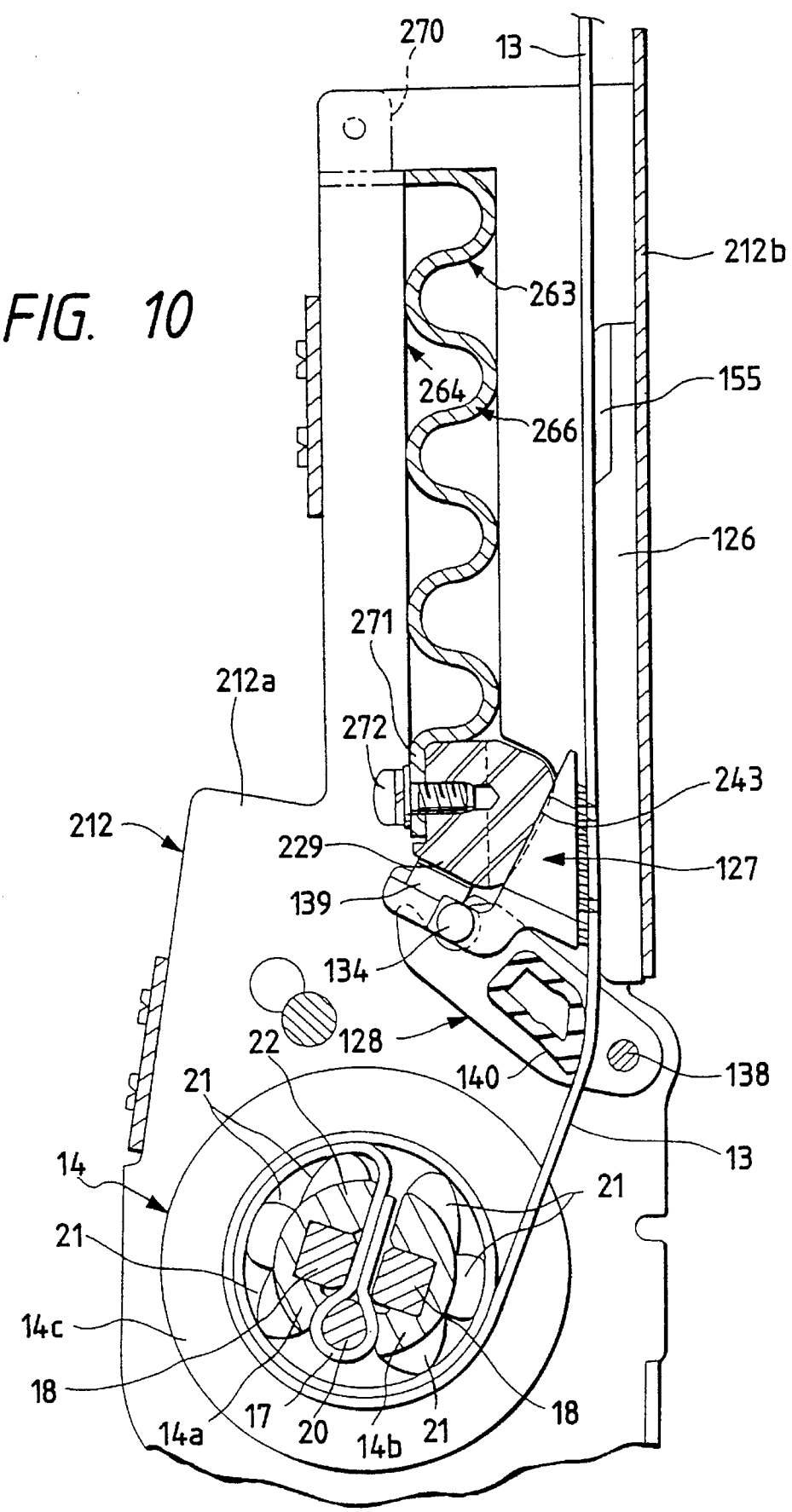
FIG. 10 is a longitudinal section view of the third embodiment according to the present invention, showing its webbing holding condition.
Figure 11:
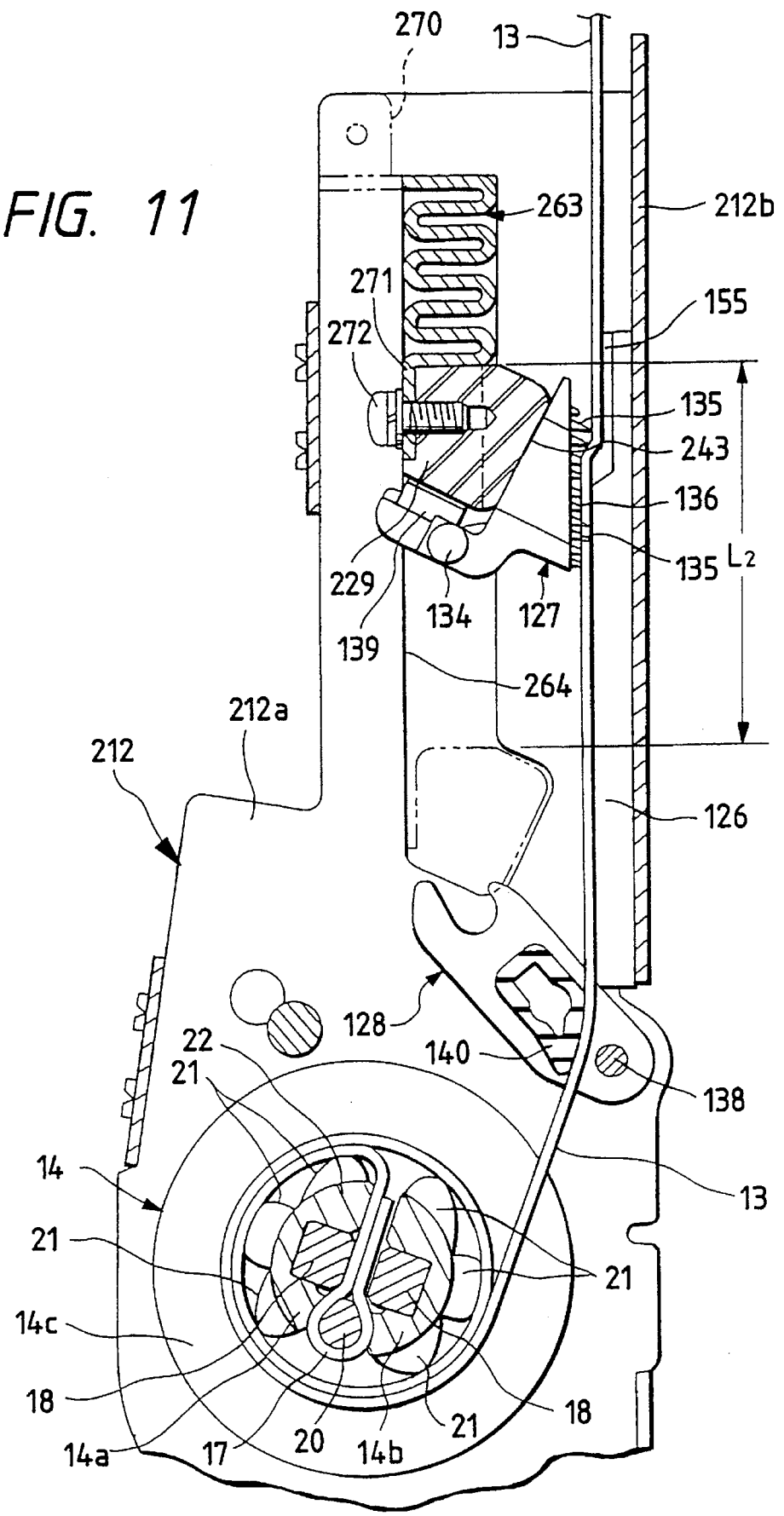
FIG. 11 is a longitudinal section view of the third embodiment according to the present invention, showing a state in which the webbing holding condition is removed.

FIGS. 8 to 11 show a third embodiment of a seat belt winding device according to the present invention. In particular, FIG. 8 is a longitudinal section view of the third embodiment, FIG. 9 is an exploded perspective view of the schematic structure of the whole device according to the third embodiment, FIG. 10 is a longitudinal section view of the third embodiment, showing a condition in which a webbing is held by a clamping mechanism 215 employed in the third embodiment, and FIG. 11 is a longitudinal section view of the third embodiment, showing a condition in which the webbing holding is removed. The third embodiment is different from the second embodiment in that the shapes of an upper stay 263 and an upper plate 229 are changed.

A clamping mechanism 215 employed in a seat belt winding device according to the third embodiment of the present invention, similarly to the second embodiment, provides a lower plate 126 fixed at a predetermined position on a base back portion 212b of a retractor base 212, a clamp member 127 including a large number of clamp teeth to be pressed against the webbing 13, a clamp lever 128 for holding the clamp member 127 and, in an emergency, for moving the clamp member 127, an upper plate 229 for guiding the clamp member 127 in such a manner that the clamp member 127 presses against the webbing 13 properly, and an upper stay 263 serving as a hold member which forms the holding device for restricting the movement of the upper plate 229 in the webbing draw-out direction.

In the third embodiment, the structure of the bobbin 14 and the structure of the ribs 21 provided in the outer periphery of the bobbin 14 are similar to those in the first embodiment and thus futher description is omitted here. Further, the lower plate 126, clamp member 127 and clamp lever 128 are also similar in structure to those in the second embodiment and thus the detailed description is omitted here.

The upper plate 229 is fixed by a screw to the plate support portion 271 of the upper stay 263 and is supported on the base side plates 212a of the retractor base 212 in such a manner that it can be freely moved in the webbing draw-out direction by a guide groove 264 formed along the base back plate portion 212b of the retractor base 212.

The upper stay 263 is formed by striking a metal plate into a desired shape and then bending the metal plate into a corrugated shape, while the portions of the upper stay 263 located upwardly of the plate support portion 271 formed in the lower end portion of the upper stay 263 are bent in a corrugated manner to provide a plastically deforming portion 266. The upper stay 263 is fitted into the guide groove formed in the retractor base 212, while a projecting piece 270 provided in the upper end of the upper stay 263 is screwed to the base side plates 212a of the retractor base 212 and the upper plate 229 is fixed to the plate support portion 271 formed in the lower end portion of the upper stay 263 by a screw 272.

The upper stay 263 is structured such that it has a width greater than the distance between the two mutually opposing base side plates 212a and also that the height of the corrugation of the plastically deforming portion 266 is substantially equal to the opening width of the guide groove 264. Also, the shape, dimensions and material of the bent portion of the upper stay 263 including the radius of curvature of the bent and the like are selected so that, if a tensile force f acting on the webbing 13 increases and thus a load in the webbing draw-out direction acting on the plate support portion 271 through the clamp member 127 and upper plate 229 reaches the above-mentioned first specific value $f_1$, then, with the movement of the clamp member 127 in the webbing draw-out direction, the bent portion can be deformed plastically in such a manner that the pitch of the corrugation of the plastically deforming portion 266 is narrowed.

According to the third embodiment, in the normal driving operation in which any abrupt deceleration due to a vehicle collision or the like does not occur, as shown in FIG. 8, the clamp member 127 is kept spaced apart from the webbing 13 by the spring force of the return spring 139 or the like.

On the other hand, in an emergency in which an abrupt deceleration due to a vehicle collision or the like occurs, the clamp lever 128 is rotated in the arrow a direction in linking with the operation of the emergency locking mechanism, which restricts the rotation of the bobbin 14, to push out the clamp member 127 along the sliding contact surface 243 of the upper plate 229 and thus, as shown in FIG. 10, to press the first and second clamp teeth 135 and 136 of the clamp member 127 against the webbing 13, thereby preventing the draw-out of the webbing 13 due to the tightening of the webbing 13.

After the draw-out of the webbing is prevented, in the above-mentioned clamping condition, if a tension exceeding a predetermined value is applied to the webbing 13 and thus a load applied to the plate support portion 271 through the clamp member 127 and upper plate 229 reaches the first specific value $f_1$, then the clamp member 127, while maintaining the webbing holding force, tends to move the plate support portion 271 together with the upper plate 229 upwardly of the retractor, so that a compression force acting on the plastically deforming portion 266 of the upper stay 263 also increases and exceeds a predetermined value. Therefore, in accordance with the movement of the clamp member 127 in the webbing draw-out direction, the plastically deforming portion 266 of the upper stay 263 is deformed in such a manner that it is crushed in the webbing draw-out direction, which makes it possible to move the plate support portion 271 in the webbing draw-out direction. As a result, as shown in FIG. 11, when the plastically deforming portion 266 is compressed to the maximum level, the plate support portion 271 is moved in the webbing draw-out direction only by a distance $L_2$.

The movement of the plate support portion 271 in the webbing draw-out direction provides the movements of the upper plate 229 and the clamp member 127 in the webbing drawing direction, which allows the webbing 13 to be drawn out. That is, the kinetic energy acting on the webbing is absorbed by the upper stay 263 according to the amount of draw-out of the webbing to thereby be able to lessen the shock to be applied to the occupant from the webbing.

Even when the upper stay 263 is structured in this shape, there can be obtained a similar operation effect to the previously described second embodiment.

Figure 12:
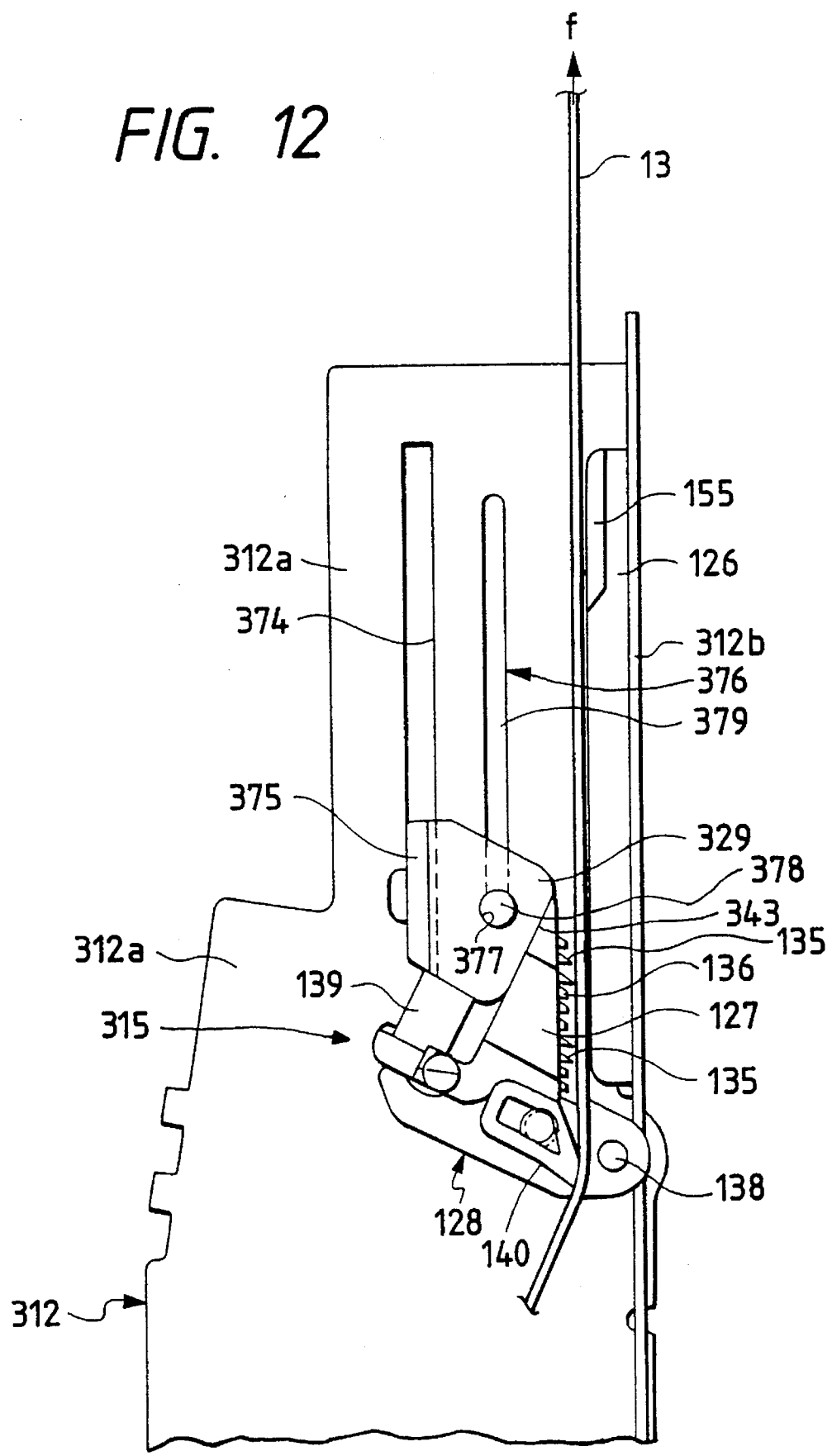
FIG. 12 is a longitudinal section view of a fourth embodiment of a seat belt winding device according to the present invention.
Figure 13:
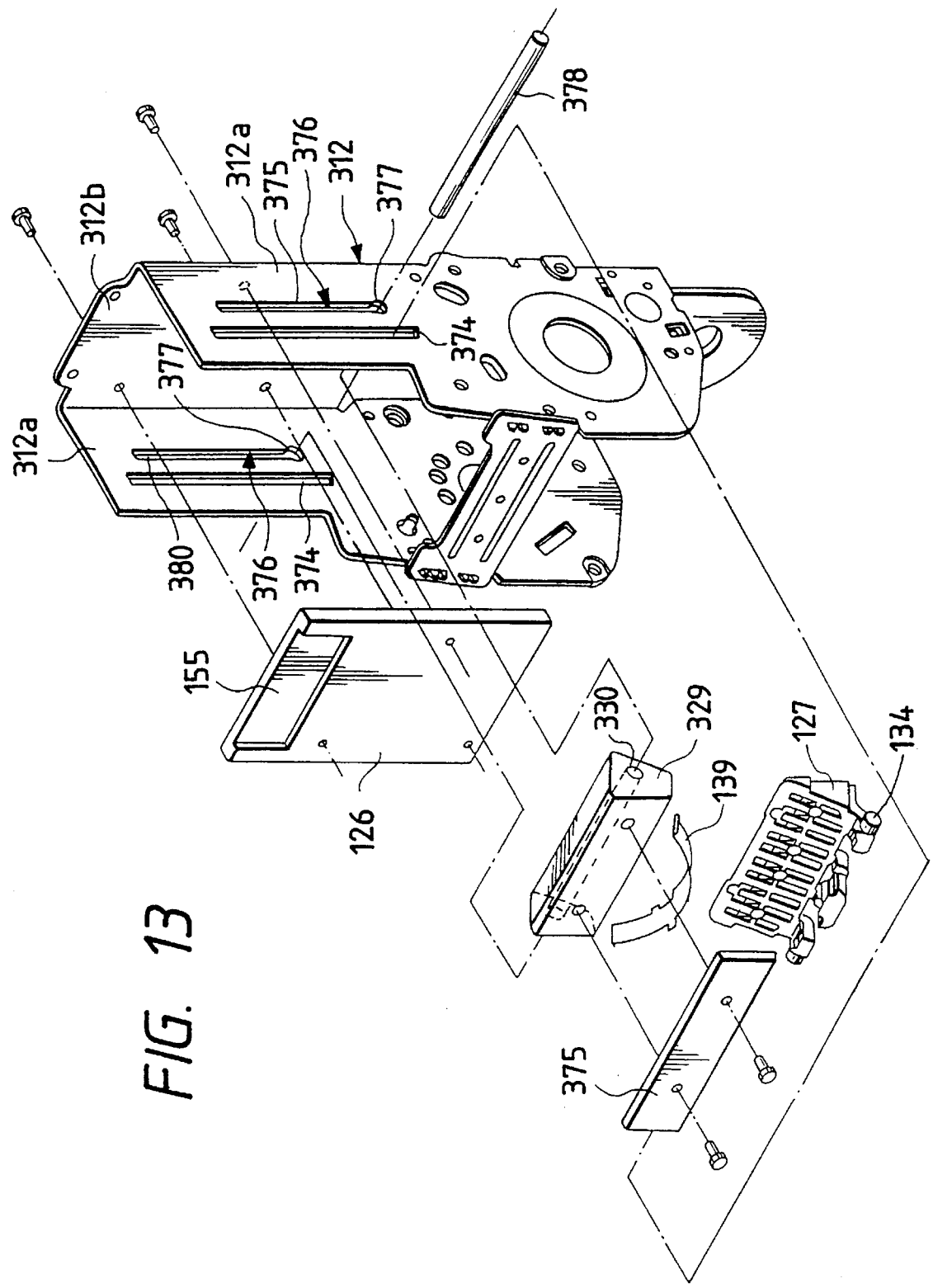
FIG. 13 is a perspective view of the whole structure of the fourth embodiment according to the present invention.
Figures 14A, 14B:
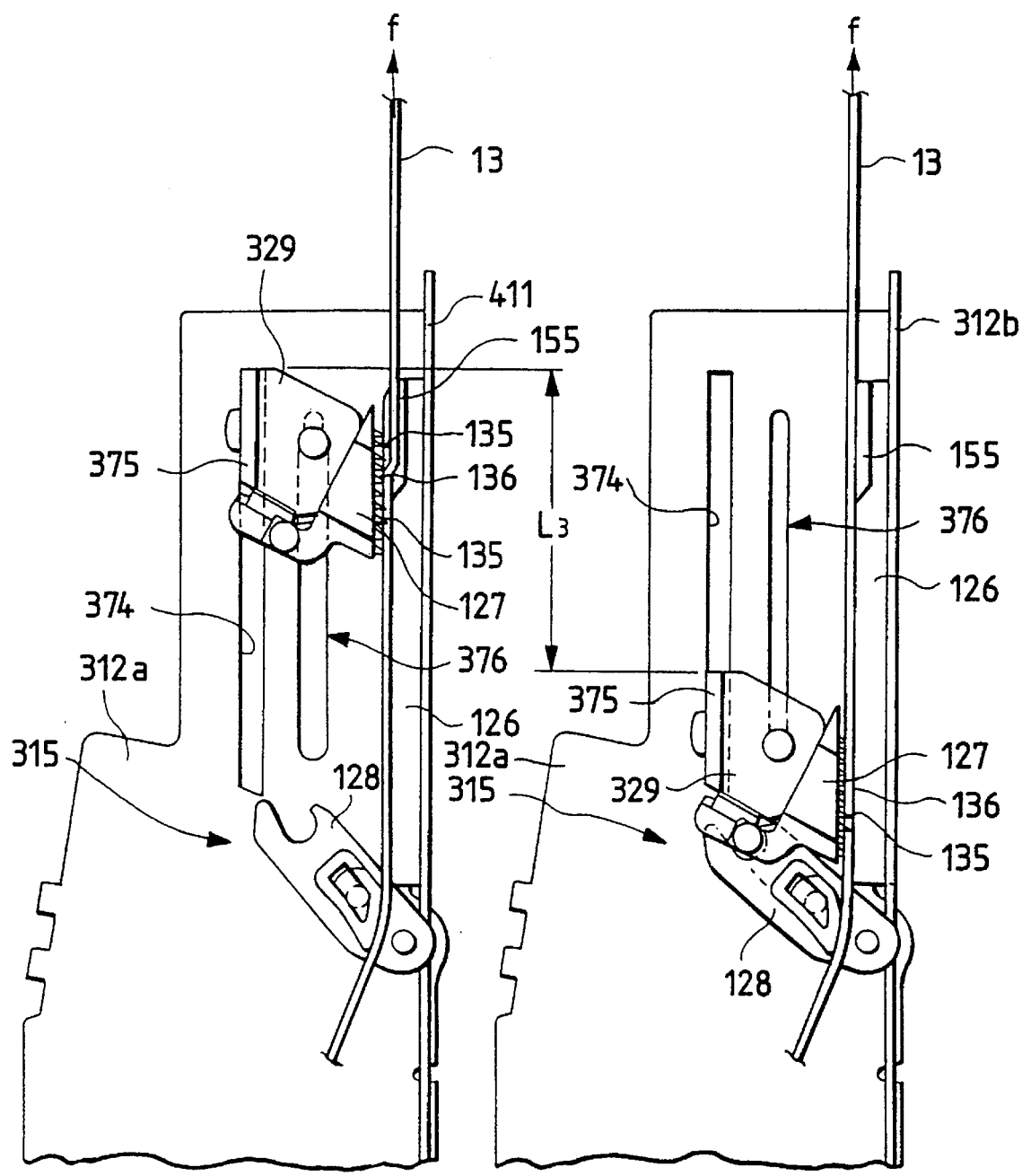
FIGS. 14A and 14B are explanatory views of a webbing holding condition in the fourth embodiment according to the present invention.

FIGS. 12 to 14B show a fourth embodiment of a seat belt winding device according to the present invention. In particular, FIG. 12 is a longitudinal section view of the fourth embodiment, FIG. 13 is an exploded perspective view of the structure of the whole seat belt winding device, and FIGS. 14A and 14B are explanatory views of the fourth embodiment, showing a state in which a belt is held by a belt clamping mechanism 315 employed in the fourth embodiment. In the fourth embodiment, the bobbin portion is omitted. Detailed description is also omitted of the components that are similar to the previously described respective embodiments.

In the fourth embodiment, a clamping mechanism 315 includes a clamp member 127, an upper plate 329 for guiding the clamp member 127 to a webbing holding position, and a through pin 378 serving as a holding pin which forms the holding device for restricting the movement of the upper plate 329 in the webbing draw-out direction.

The upper plate 329 is a metal solid member which has a longitudinal length that is shorter than the distance between a pair of mutually opposing base side plates 312a provided in a retractor base 312, and the upper plate 329 includes a sliding contact surface 343 for guiding the clamp member 127 toward the webbing side. Further, in each of the mutually opposing base side plates 312a, there are formed a guide groove 374 including an elongated hole extending along a base back plate portion 312b in the same direction thereof, and a slit 376 extending in parallel to the guide groove 374. The slit 376 includes an open support portion 377 which is open in the neighborhood of the lower end portion of the guide groove 374 and has a shape almost identical with the transverse section shape of the through pin 378, and an elongated hole portion 379 extending upwardly from the open support portion 377 and having a width smaller than the diameter of the through pin 378.

Also, the upper plate 329 is fixed by a screw to a slide plate 375 two end portions of which are fitted into the guide groove 374. Further, the through pin 378 extends through a through hole 330 opened up in the upper plate 329 in the longitudinal direction thereof and the two end portions of the through pin 378 are fitted into the open support portion 377, thereby preventing the movement of the upper plate 329 in the webbing draw-out direction. That is, since the width of the elongated hole portion 379 in communication with the open support portion 377 is smaller than the diameter of the through pin 378, the through pin 378 is supported by the open support portion 377, so that the through pin 378 is prevented from moving upwardly.

Therefore, the through pin 378 cooperates with the slit 376 in forming the hold device for restricting the movement of the upper plate 329 in the webbing draw-out direction. If a load of the above-mentioned first specific value $f_1$ is applied to the through pin 378 by the clamp member 127, then the through pin 378 deforms plastically the slit 376, which is a plastically deforming portion formed in the base side plates 312a of the retractor base 312, thereby allowing the upper plate 329 to move in the webbing draw-out direction.

According to the fourth embodiment, in a normal vehicle driving operation and the like in which an abrupt deceleration due to a vehicle collision or the like does not occur, as shown in FIG. 12, the clamp member 127 is kept spaced apart from the webbing 13 by the spring force of the return spring 139 or the like.

On the other hand, in an emergency in which an abrupt deceleration due to a vehicle collision or the like occurs, the clamp lever 128 is rotated in linking with the operation of the emergency locking mechanism for restricting the rotation of a bobbin (not shown) to push out the clamp member 127 along the sliding contact surface 343 of the upper plate 329 and thus, as shown in FIG. 14A, to press the first and second clamp teeth 135 and 136 of the clamp member 127 against the webbing 13, thereby preventing the draw-out of the webbing 13 due to the tightening of the webbing 13.

After the draw-out of the webbing is prevented, in the above-mentioned clamped condition, if a tensile force exceeding a predetermined value acts on the webbing 13 and thus the load in the webbing draw-out direction acting on the through pin 378 through the clamp member 127 and upper plate 329 reaches the first specific value $f_1$, then the clamp member 127, while maintaining the webbing holding force, tries together with the upper plate 329 to move the through pin 378 upwardly of the retractor so that a pressure acting on the lower end portion of the slit 376 increases and exceeds a predetermined value. Therefore, in accordance with the movement of the clamp member 127, the peripheral portion of the slit 376 of the upper plate 329 is spread open or is deformed plastically, with the result that the clamp member 127, upper plate 329 and the like are allowed to move together in the webbing draw-out direction as shown in FIG. 14B. Finally, the clamp member 127 is moved in the webbing draw-out direction by a distance $L_3$ according to the length of the slit 376 as shown in FIGS. 14A and 14B. Then, the plastic deformation of the peripheral portion of the slit 376 can absorb the kinetic energy acting on the webbing 13.

On completion of the plastic deformation of the peripheral portion of the slit 376, as shown in FIG. 14B, the engagement between part of the first clamp teeth 135 formed on the front end side of the clamp member 127 and the webbing is removed by the escaping of the webbing into a webbing escaping recess 155 formed in the lower plate 126, while the remaining part of the first clamp teeth 135 still engaged with the webbing 13 are sheared or deformed to allow the webbing to be drawn out.

Therefore, in the fourth embodiment as well, there can be obtained a similar operation effect to the previously described respective embodiments.

Here, referring to the structure of the rib 21 used in the respective embodiments, the rib 21 is arranged such that it projects in the radial direction of the barrel portion of the bobbin. However, the present invention is not limited to such structure but the projecting height of the rib in the radial direction, the shape of the rib and the like can also be changed properly.

Figure 15:
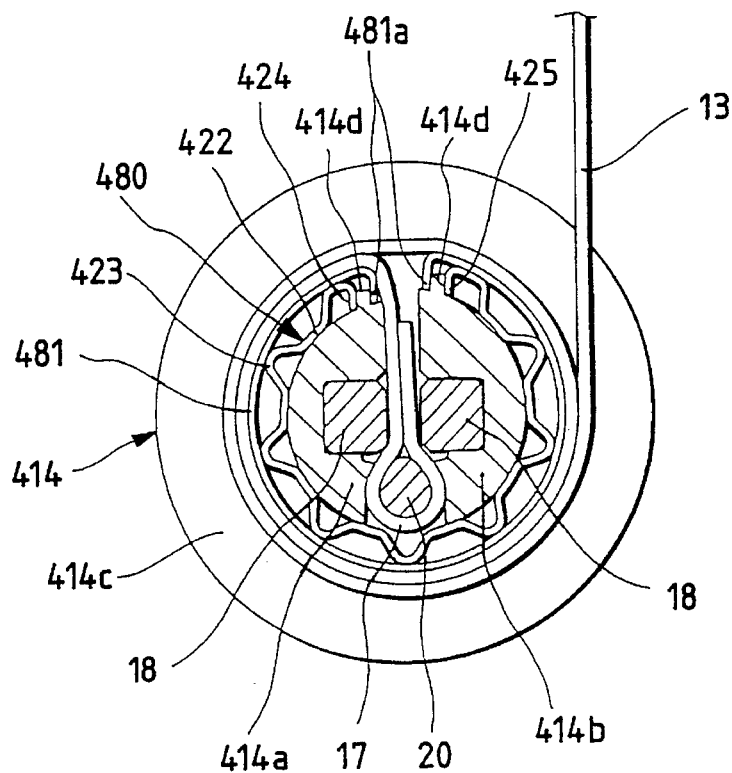
FIG. 15 is a section view of the main portions of a winding mechanism employed in a fifth embodiment of a seat belt winding device according to the present invention.

FIG. 15 shows a fifth embodiment of a seat belt winding device according to the present invention and, in particular, there is shown a second embodiment of a plastically deforming member to be provided in the outer periphery of a bobbin 414. Although the clamping mechanism portion of the fifth embodiment is not shown in FIG. 15, the present embodiment is used in combination with any of the clamping mechanisms employed in the first to fourth embodiments of the present invention.

A plastically deforming member 480 shown in FIG. 15 has a substantially cylindrical shape as a whole, in particular, the plastically deforming member 480 has a substantially C-shaped section including a slit opened along an axis thereof. The member 480 is so structured that the outer peripheral shape thereof has crown and valley portions. That is, the plastically deforming member 480 includes a plurality of cylindrical base portions 422 forming the inner peripheral side of the plastically deforming member 480, and a plurality of projecting portions 423 each having a substantially semicircular section and respectively projecting outwardly in the radial direction and extending in parallel to the cylindrical base portions 422 along the whole length of the cylindrical base portions in the axial direction of the cylindrical base portions 422, while the base portions 422 and projecting portions 423 are arranged spaced from one another at almost equal distances in the peripheral direction of the plastically deforming member 480. A cylindrical collar 481 having a substantially C-shaped section is fitted over the outer periphery of the plastically deforming member 480.

The collar 481, as shown in FIG. 15, has an almost C-shaped section and includes a slit-like opening extending along the axis thereof. In the opening, there are provided bent portions 481a which respectively extend inwardly in the radial direction of the collar 481. The bent portions 481a can be engaged with stopper portions 414d, 414d respectively formed in the barrel portions 414a, 414b of the bobbin 414, so that the collar 481 can be rotated integrally with the bobbin 414.

Next, description will be given below of the operation of the plastically deforming member 480 according to the embodiment.

If a tensile force exceeding a predetermined value acts on the webbing 13 wound around the outer peripheral surface of the collar 481 of the plastically deforming member 480, then the plastically deforming member 480 is tightened by the webbing 13 and thus the wall surface of the collar 481 is deformed inwardly in the radial direction of the collar 481 between the projecting portions 423 provided in the cylindrical base portion 422 to reduce the substantial outside diameter of the bobbin barrel portion. In this case, the webbing 13 is wound around the collar 481 in a substantially circular shape independent of the distance between the projecting portions 423 and the like. That is, according to the present embodiment, the winding condition of the webbing is not affected by the shape of the projecting portion 423 and the distance between the projecting portions 423 and the shape thereof can be set freely to enhance the freedom of the structure of the present seat belt winding device.

Figure 16:
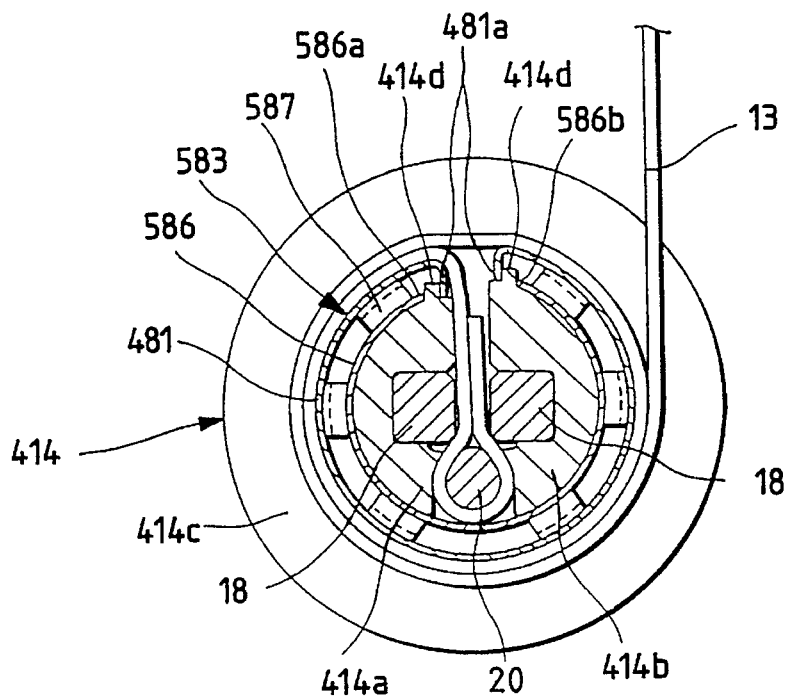
FIG. 16 is a section view of the main portions of a winding mechanism employed in a sixth embodiment of a seat belt winding device according to the present invention.
Figure 17:
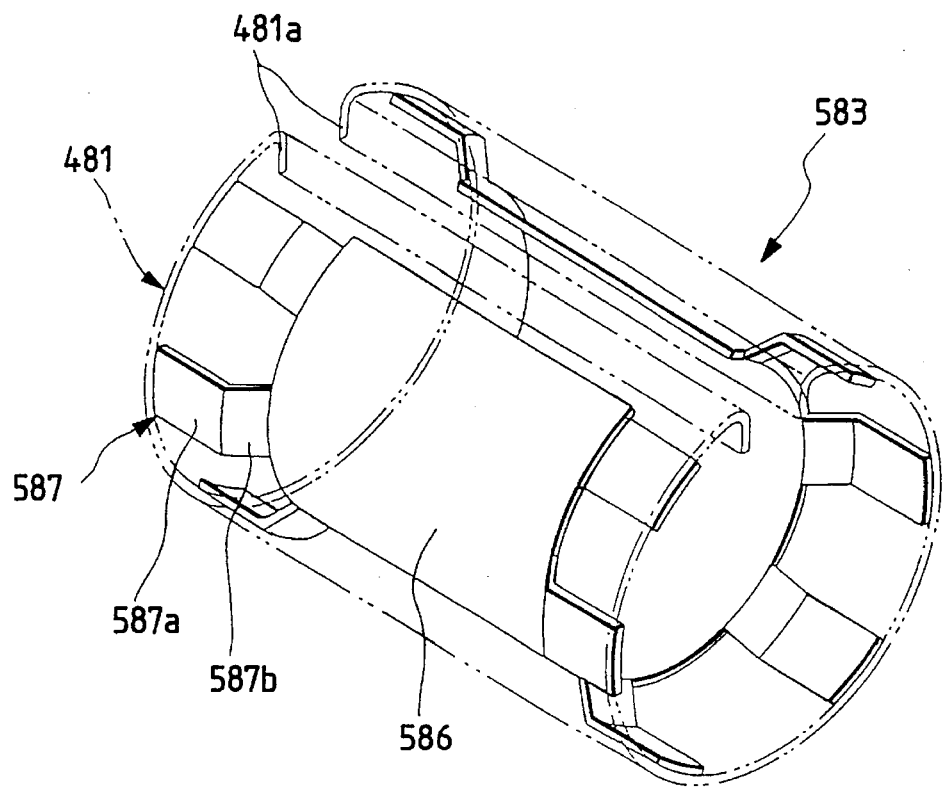
FIG. 17 is a perspective view of a plastically deforming member shown in FIG. 16.

FIGS. 16 and 17 show a sixth embodiment of a seat belt winding device according to the present invention, in particular, there is shown a third embodiment of a plastically deforming member to be mounted on the outer periphery of the bobbin 414. The present embodiment can also be used in combination with any one of the clamping mechanisms employed in the previously described first to fourth embodiments of the present invention.

According to the plastically deforming member 583 shown in FIGS. 16 and 17, the shape of the projecting portion 423 employed in the fifth embodiment is different and a collar having the same shape as the collar 481 employed in the fifth embodiment is fitted over the plastically deforming member 583.

That is, in the plastically deforming member 583 according to the present embodiment, as shown in FIG. 17, projecting portions 587 respectively extending outwardly in the axial direction of the plastically deforming member 583 and outwardly in the radial direction thereof are provided in the two end portions of a cylindrical base portion 586 in the axial direction thereof, while the base portion 586 has a substantially C-shaped section fittable with the outer peripheral surfaces of the barrel portions 414a, 414b of the bobbin 414. Each of the projecting portions 587 includes a wall surface 587a extending in parallel to the wall surface of the cylindrical base portion 586 and an inclined wall surface 587b for connecting the two parallel walls with each other.

Therefore, if the plastically deforming member 583 according to the present embodiment is tightened with the webbing 13, then the projecting portions 587 of the plastically deforming member 583 are caused to fall down in such a manner that they are closely contacted with the barrel portions 414a, 414b of the bobbin 414. Alternatively, the plastically deforming member 583 can also be structured such that, in the middle of the falling-down process of the projecting portions 587, the ends of the projecting portions 587 can be contacted with the wall surface of the flange portion 414c of the bobbin 414. If the ends of the projecting portions 587 are contacted with the flange portion 414c in the middle of their deforming process, then the deforming resistance thereof can be large. If the amount of rising of the projecting portion 587 in the radial direction and the amount of projection thereof in the axial direction are changed wholly or individually, then it is possible to adjust the deforming resistance of the projecting portion 587 when it is deformed, so that a tensile force to be produced in the webbing 13 can be set for a proper value according to particular cases.

Figure 18:
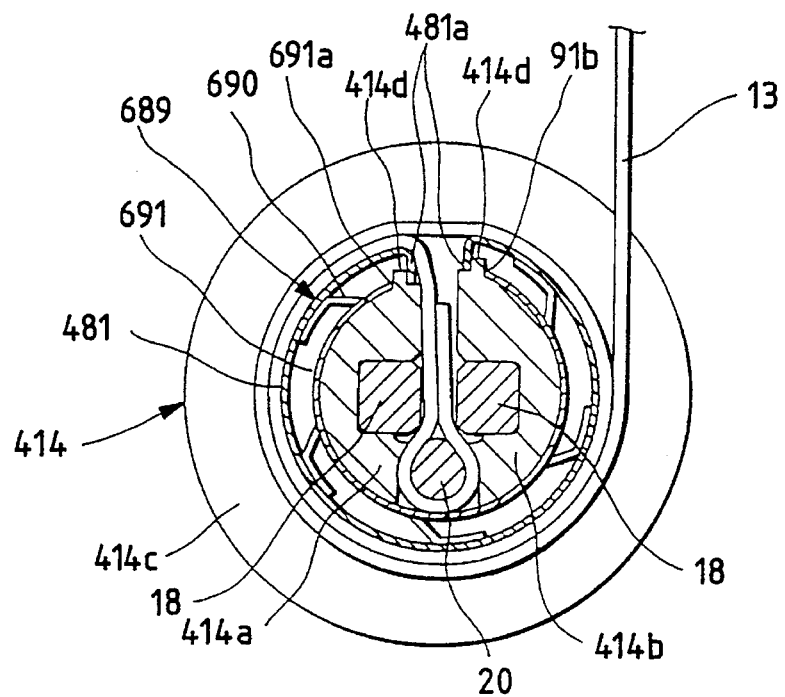
FIG. 18 is a section view of the main portions of a winding mechanism employed in a seventh embodiment of a seat belt winding device according to the present invention.
Figure 19:
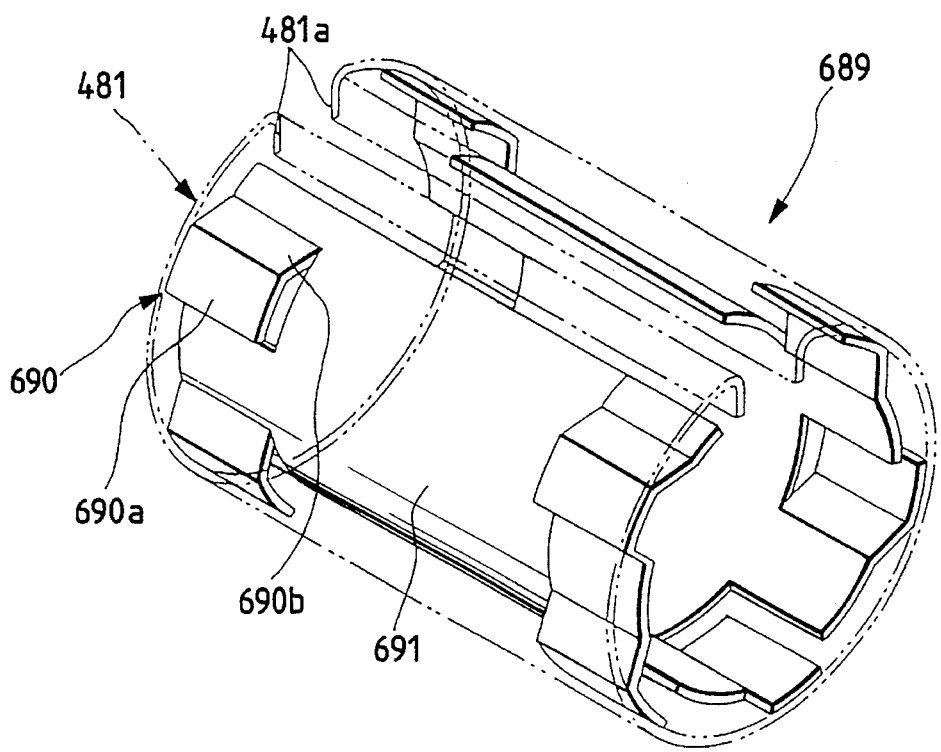
FIG. 19 is a perspective view of one of plastically deforming members shown in FIG. 18.

FIGS. 18 and 19 show a seventh embodiment of a seat belt winding device according to the present invention, in particular, this embodiment is a still further modification of a plastically deforming member to be mounted on the outer periphery of the bobbin 414. In the plastically deforming member 689 shown in FIGS. 18 and 19, the projecting portion 587 of the plastically deforming member employed in the sixth embodiment is modified in shape. The present embodiment is also used in combination with any one of the clamping mechanisms employed in the first to fourth embodiments.

The plastically deforming member 689 according to the present embodiment includes projecting portions 690 which are respectively formed in both axial ends of a cylindrical base portion 691 of the plastically deforming member 689 by projectingly cutting the respective ends of the cylindrical base portion 691 in the circumferential direction thereof. That is, each of the projection portions 690 includes a wall surface 690a extending in parallel to the wall surface of the cylindrical base portion 691, and an inclined wall surface 690b for connecting the two parallel wall surfaces, while the projectingly cutting direction thereof extends in the circumferential direction of the cylindrical base portion 691.

Similarly to the fifth and sixth embodiments, a cylindrical collar 481 is fitted over the outer periphery of the plastically deforming member 689.

In the fifth to seventh embodiments, each of the plastically deforming members is formed by striking and bending a plate-like material, the width thereof being substantially uniform over the whole member. However, according to the present invention, alternatively, the plastically deforming member can also be structured in such a manner that the deforming resistance thereof can be controlled by partially varying the thickness of the material. Also, according to the present invention, there can be employed such a structure that a plurality of plastically deforming members having different deforming resistances can be properly assembled together on the bobbin with their respective deformation starting timings differing from one another.

FIGS. 20 to 23 show an eighth embodiment of a seat belt winding device according to the present invention. In the present embodiment, no clamping mechanism is shown but this embodiment is used in combination with any one of the clamping mechanisms used in the first to fourth embodiments.

Figure 21:
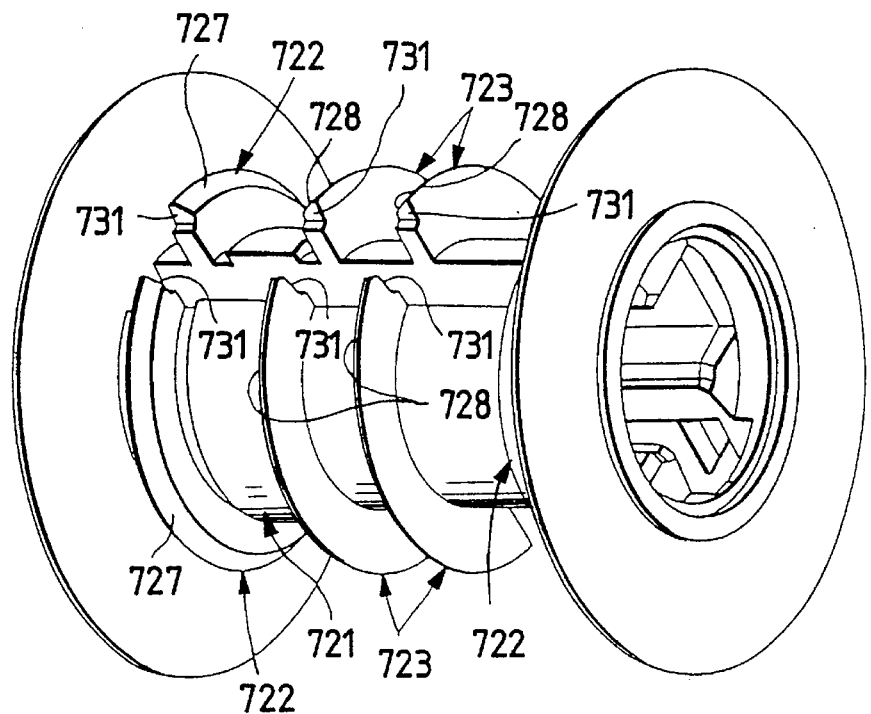
FIG. 21 is a perspective view of a bobbin in a winding mechanism employed in the eighth embodiment of a seat belt winding device according to the present invention.
Figure 22:
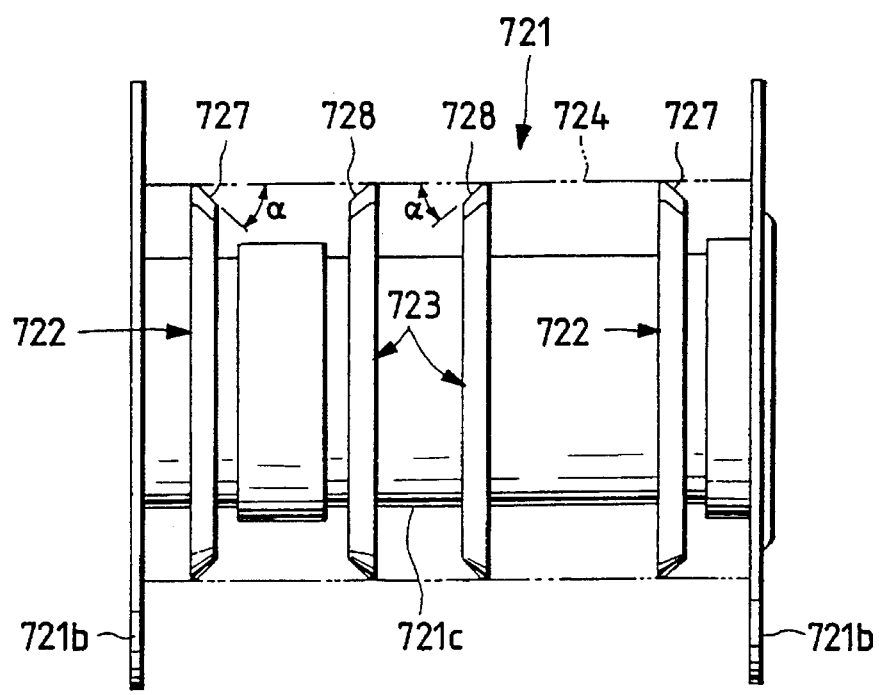
FIG. 22 is a plan view of a bobbin in a winding mechanism employed in the eighth embodiment of a seat belt winding device according to the present invention.

As shown in FIGS. 20 to 22, a winding portion 720 provides a bobbin 721 which includes two flanges 721b respectively formed in both ends of the bobbin 721 and a plurality of plastically deforming members 722, 723 respectively provided on the outer peripheral surface of a barrel portion 721c of the bobbin 721, the bobbin being rotatably supported by a winding shaft 18. In an emergency, in the case where the holding of the webbing 13 by the clamping mechanism is removed, if the plastically deforming members 722, 723 receive the load acting on the webbing 13 through a collar 724 (FIG. 23) provided to cover the end portions of the plastically deforming members 722, 723, then they are plastically deformed to reduce the substantial winding diameter of the bobbin 721, so that the webbing 13 can be drawn out from the bobbin 721.

Each of the plastically deforming members 722, 723 can be composed of a thin plate which is formed of metal such as aluminum, aluminum alloy and the like, or is formed of synthetic resin or the like. For example, as shown in FIGS. 21 and 22, a total of eight plastically deforming members can be provided, which includes four rows of plastically deforming members arranged in the axial direction of the bobbin 721 at predetermined distances from one another, with each row including two plastically deforming members, while every two of them extend almost around the outer peripheral surface of the bobbin 721 in the peripheral direction thereof.

The plastically deforming members 722, 723 are respectively arranged in ribs lying at right angles to the bobbin 721 in such a manner that they project in the radial direction of the bobbin 721. The plastically deforming members 722, 723 respectively includes inclined surfaces 727, 728 in the end portions thereof. Out of the inclined surfaces 727, 728 of the plastically deforming members 722,723, the inclined surfaces 727 of two rows of plastically deforming members 722 situated near the right and left ends of the bobbin 721 in the axial direction thereof, that is, a total of four plastically deforming members 722 (which can also be referred to as the right and left plastically deforming members hereinafter) are formed in a tapered manner in which they are made narrower left and upwardly in FIG. 22 toward the ends thereof. Also, the inclined surfaces 728 of two rows of plastically deforming members 723 situated near the central portion of the bobbin 721 in the axial direction thereof, that is, a total of four plastically deforming members 723 (which can also be referred to as the central plastically deforming members hereinafter) are formed in a tapered manner in which they are made narrower right and upwardly in FIG. 22 toward the ends thereof. Therefore, the inclined surfaces 727, 728 are respectively in contact with the inner peripheral surface of the collar 724 at a substantially predetermined angle α.

When the right and left plastically deforming members 722 and central plastically deforming members 723, in an emergency, receive the load acting on the webbing through the collar 724 when the holding of the webbing 13 by the clamping mechanism is removed, then the inclined surfaces 727, 728 of the collar 724 are contacted with the inner peripheral surface of the collar 724 at a predetermined angle α. As a result, a transverse force viewed from the side of the inclined surface (which is a force in a axial direction of the winding shaft) are applied to the respective plastically deforming members 722, 723 as a component of the tightening force, so that the right and left plastically deforming members 722 and central plastically deforming members 723 are plastically deformed along predetermined directions set separately for each of the plastically deforming members 722, 723 in such a manner that the plastically deforming members 722, 723 are not overlapped on one another.

Since the inclined surfaces 727 of the right and left plastically deforming members 722 are respectively tapered left upwardly in FIG. 22 toward the ends thereof, the right and left deforming members 722 are plastically deformed in such a manner that they fall down about 90° left in FIG. 22. On the other hand, since the inclined surfaces 728 of the central plastically deforming members 723 are respectively tapered right upwardly in FIG. 22 toward the ends thereof, the central plastically deforming members 723 are plastically deformed in such a manner that they fall down about 90° right in FIG. 22. That is, the plastically deforming members 722, 723 can be plastically deformed in such a manner that they are not overlapped on one another when they fall down.

Figure 23:
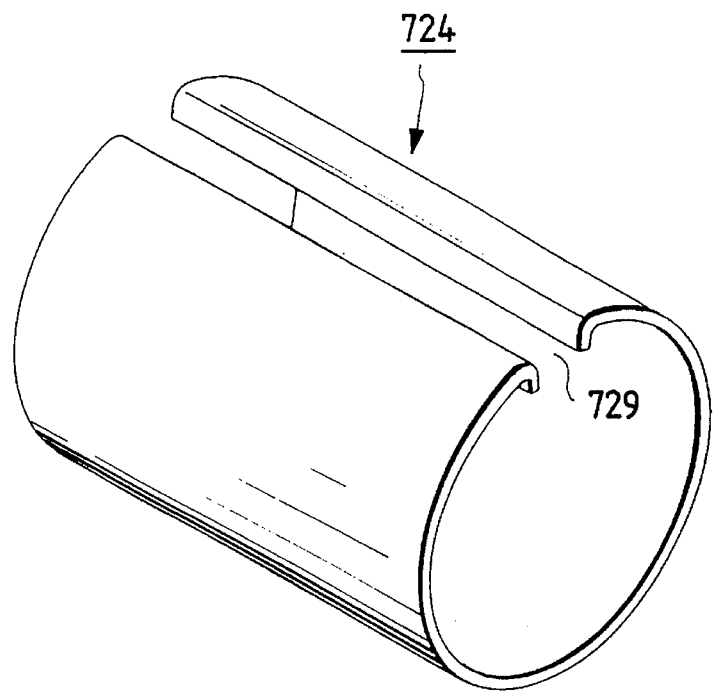
FIG. 23 is a perspective view of a collar in a winding mechanism employed in the eighth embodiment of a seat belt winding device according to the present invention.

The collar 724, as shown in FIGS. 22 and 23, includes a slit 729 formed at a position corresponding to a slit portion (FIG. 20) of the bobbin 721 (FIG. 19), and is formed in a cylindrical shape which has a substantially C-shaped section. Both the two side portions of the collar 724 with the slit 729 between them are bent substantially at right angles inwardly in the radial direction of the collar 724 to form bent portions which can be fitted with stopper portions 731 (FIG. 20) formed in the plastically deforming members 722, 723 (FIG. 20), respectively.

With the slit 729 in communication with the slit 726 of the bobbin 721, the collar 724 not only covers the outer peripheral surfaces of the plastically deforming members 722, 723 and bobbin 721 but also allows the load produced due to the tightening of the webbing 13 to be carried substantially uniformly by the respective plastically deforming members 722, 723.

Next, description will be given below of the operation of the eighth embodiment.

At first, when the webbing 13 is mounted such that it is able to restrain the body of the occupant, as shown in FIG. 20, the webbing 13 is wound several times around the collar 724 mounted on the end portions of the respective plastically deforming members 722, 723 of the bobbin 721.

If an abrupt deceleration is produced in a vehicle body due to a collision or the like, then the emergency locking mechanism secures the winding shaft 18 to prevent the rotation of the bobbin 721 and, at the same time, the clamping mechanism holds the webbing 13, thereby preventing the draw-out of the webbing 13 from the bobbin 721. At that time, the tensile force acting on the webbing 13 increases due the restraint of the occupant body to a seat (not shown), and the webbing tensile force increases further with passage of time (actually, instantaneously). If the tensile force acting on the webbing 13 reaches a predetermined value, then the clamping mechanism removes the holding of the webbing 13.

When the holding of the webbing 13 by the clamping mechanism is removed, then the webbing 13 is tightened to push the collar 724 inwardly in the radial direction of the barrel portion 721C, so that the diameter of the collar 724 is reduced. At that time, when the ends of the plastically deforming members 722, 723 are pushed strongly by the inner peripheral surface of the collar 724, then the transverse force viewed from the side of the respective inclined surfaces 727, 728 (which is a force in the axial direction of the winding shaft) is applied as a component of the webbing tightening force onto the plastically deforming members 722, 723, so that the plastically deforming members 727, 728 are plastically deformed in such a manner that they fall down along their respective predetermined directions separately set for the right and left plastically deforming members 722 and central plastically deforming members 723.

That is, the right and left plastically deforming members 722 are respectively deformed plastically in such a manner that they fall down about 90° left in FIG. 22 according to the inclined directions of the inclined surfaces 727, while the central plastically deforming members 723 are plastically deformed in such a manner that they fall down about 90° right in FIG. 22 according to the inclined directions of the inclined surfaces 728. Therefore, the plastically deforming members 722, 723 are plastically deformed in such a manner that they are not overlapped when they fall down.

This makes it possible to reduce the substantial winding diameter of the bobbin 721 uniformly and positively. According to the amount of reduction of the bobbin winding diameter, the webbing 13 can be drawn out from the bobbin 721.

As described above, according to the above-mentioned eighth embodiment, in an emergency, when the holding of the webbing 13 by the clamping mechanism is removed, the plastically deforming members 722, 723 can reduce the substantial winding core diameter of the barrel portion 721c of the bobbin 721 uniformly and positively over the whole periphery thereof due to the load to be almost uniformly applied to the webbing 13 through the collar 724, and thus can decrease positively the maximum value of the tensile force to be produced in the webbing 13. Therefore, while minimizing the load to be applied to the occupant from the webbing 13, the kinetic energy acting on the occupant can be absorbed effectively and positively, thereby being able to protect the occupant positively.

Also, since the inclined surfaces 727, 728 formed in the end portions of the plastically deforming members 722,723 are respectively contacted with the inner peripheral surfaces of the collar 724 at a predetermined angle of $\alpha$, the falling directions, namely, the deforming directions of the plastically deforming members 722,723 can be previously specified. Unlike the conventional seat belt winding device which does not present the deforming directions of the plastically deforming members, the distance between the plastically deforming members 722, 723 on the outer peripheral surface of the bobbin 721 can be set strictly. This not only can secure easily a sufficient number of plastically deforming members 722, 723 to obtain a required deforming load but also can set the deforming loads of the plastically deforming members 722, 723 accurately.

Further, in the eighth embodiment, although the inclined surfaces 727, 728 are formed only in the end portions of the plastically deforming members 722, 723 and are contacted with the collar 724 at a predetermined angle $\alpha$, alternatively, the inclined surfaces can also be formed over the entire portions of the plastically deforming members 722, 723.

Figure 24:
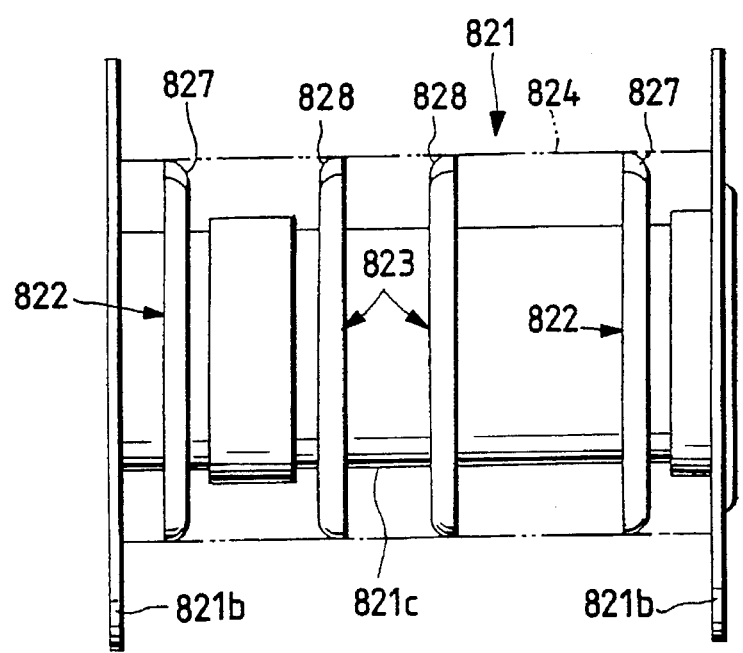
FIG. 24 is a plan view of a bobbin used in a ninth embodiment of a seat belt winding device according to the present inventions.

FIG. 24 illustrates a ninth embodiment of a seat belt winding device according to the present invention. Although, according to the eighth embodiment, the inclined surfaces 727, 728 of the plastically deforming members 722, 723 are respectively formed in a plane, alternatively, according to the ninth embodiment shown in FIG. 24, inclined surfaces 827, 828 can also be formed in an arc-shaped surface. With use of the arc-shaped surface, in an emergency, when the webbing 13 is tightened around the bobbin 821 through a protector 724, the inclined surfaces 827, 828 of the respective plastically deforming members 822, 823 can be slid more smoothly with respect to the inner peripheral surface of the protector 724.

In addition, in the eighth and ninth embodiments, on the outer peripheral surface of the bobbin, the plastically deforming members are arranged in the axial direction of the bobbin in four rows spaced at a predetermined distance from one another, while a set of two plastically deforming members cooperate together in making a round of the outer peripheral surface of the bobbin along the circumferential direction thereof, that is, a total of eight plastically deforming members are provided. However, the present invention is not limited to this but, alternatively, the plastically deforming members can also be provided in such a manner that they are arranged along the peripheral direction of the bobbin in a plurality of rows spaced at a predetermined distance apart from one another and also that the right and left end portions of the plastically deforming members are connected with one another in the axial direction of the bobbin.

As described above, according to the seat belt winding device of the present invention, since the plastic deformation is repeated in stages in both of the clamp supporting device and plastically deforming members, a larger amount of kinetic energy can be absorbed on the side of the seat belt winding device. Further, it is possible to increase the amount of draw-out of the webbing after the webbing restraint is removed by the clamping mechanism as the need arises. For this reason, regardless of differences between the characteristics of vehicles, the amount of draw-out of the webbing in an emergency can be set with more accuracy, which makes it possible to reduce the damage to the occupant greatly in an emergency.

Therefore, increase or decrease in the tensile force acting on the seat belt after the webbing is held by the clamping mechanism can be controlled to a gentle level and the maximum value of the tensile force can be reduced, which makes it possible to reduce effectively the shocks to be applied to the occupant from the seat belt in an emergency such as a vehicle collision and the like.

Further, according to the present invention, when the webbing holding by the clamping mechanism is removed, not only the diameter of the plastically deforming member of the bobbin can be reduced greatly since the plastically deforming members project in the radial direction of the bobbin, but also the deforming direction of the plastically deforming members due to the tightening of the webbing can be specified because the end surfaces of the plastically deforming members are respectively formed in an inclined surface which is inclined in a specific direction. This allows the substantial winding diameter of the bobbin to be reduced uniformly and positively. Therefore, for example, the load to be applied to the occupant from the seat belt can be minimized and also the kinetic energy produced in the occupant can be absorbed effectively and positively.

What is claimed is:

1. A seat belt winding device with a clamping mechanism for directly holding a webbing in an emergency of a vehicle, comprising:
    a retractor base;
    a lower plate fixed to the retractor base;
    a movable clamp member for holding a webbing between the lower plate and the clamp member, the clamp member including:
        a plurality of clamp teeth for clamping and engaging the webbing to a webbing opposing surface of the clamp member;
        a flat portion located on an opposite side of the webbing opposing surface;
        a rear edge located on a rear end of the flat portion; and
        a flat surface located in a front end of the clamp member;
    an upper plate for guiding the clamp member to a webbing holding position, the upper plate including:
        an inclined portion sliding on the flat portion of the clamp member;
        a guide portion extending from a front end of the inclined portion in parallel to the webbing; and
        a stopper portion coupled to a front end of the guide portion, the inclined portion and guide portion being deformed by the rear edge of the clamp member in accordance with a movement of the clamp member in a webbing draw-out direction when a load acting on the upper plate exceeds a predetermined value;
    a winding shaft rotatably supported by the retractor base; and
    a bobbin rotated integrally with the winding shaft, the bobbin including a plastically deforming member deformed by a load to be applied to the webbing on an outer periphery of the bobbin.

2. The seat belt winding device of claim 1, wherein the clamp teeth of the clamp member include first clamp teeth with sharpened ends and second clamp teeth with flat ends, the sharpened ends of the first clamp teeth being shearable or deformable when a tensile force acting on the webbing exceeds a predetermined value during the holding of the webbing between the lower plate and the clamp member, and
    wherein the lower plate includes a webbing escaping recess on a front upper surface thereof, the webbing escaping recess allowing a part of the first clamp teeth, which are stuck to the webbing, to disengage from the webbing when a plastic deformation of the upper plate is completed.

3. A seat belt winding device with a clamping mechanism for directly holding a webbing in an emergency of a vehicle, comprising:
    a retractor base;
    a lower plate fixed to the retractor base;
    a movable clamp member for holding a webbing between the lower plate and the clamp member, the clamp member including clamp teeth for clamping and engaging the webbing to a webbing opposing surface of the clamp member;
    an upper plate for guiding the clamp member to a webbing holding position; and
    a holding means for preventing a movement of the upper plate in a webbing draw-out direction, the holding means including a plastically deforming portion deformed in accordance with a movement of the clamp member in the webbing draw-out direction;
    a winding shaft rotatably supported by the retractor base; and
    a bobbin rotated integrally with the winding shaft, the bobbin including a plastically deforming member deformed by a load applied to the webbing on an outer periphery of the bobbin,
    wherein the upper plate is fixed to the holding means and so structured that the plastically deforming portion of the holding means is plastically deformed in accordance with the movement of the clamp member in the webbing draw-out direction to move in the webbing draw-out direction while keeping the webbing holding force of the clamp member when a load acting on the holding means exceeds a predetermined value.

4. The seat belt winding device of claim 3, wherein the plastically deforming member includes a cylindrical base portion and a projecting portion having a substantially semicircular section and extending in parallel to the cylindrical base portion in an axial direction thereof, the plastically deforming member fitting a cylindrical collar which has a substantially C-shaped section over an outer periphery of the plastically deforming member.

5. The seat belt winding device of claim 3, wherein the plastically deforming member includes a cylindrical base portion and projecting portions respectively extending outwardly in an axial and a radial directions of the cylindrical base portion in both axial ends thereof, the plastically deforming members fitting a cylindrical collar which has a substantially C-shaped section over an outer periphery of the plastically deforming member.

6. The seat belt winding device of claim 3, wherein the plastically deforming member includes a cylindrical base portion and projecting portions respectively formed by projectingly cutting both axial ends of the cylindrical base portion, the plastically deforming members fitting a cylindrical collar which has a substantially C-shaped section over an outer periphery of the plastically deforming member.

7. The seat belt winding device of claim 3, wherein the plastically deforming member is so arranged that ribs are formed on the bobbin apart from one another at a predetermined distance in an axial direction of the bobbin, the ribs projecting in the radial direction of the bobbin.

8. The seat belt winding device of claim 7, wherein the plastically deforming member comprises both of first deforming members situated near right and left ends of the bobbin in the axial direction thereof and both of second deforming members situated near a central portion of the bobbin in the axial direction thereof, the first and second deforming members being arranged in four rows spaced apart from one another in the axial direction of the bobbin by a predetermined distance, the first and second deforming members including inclined surfaces in end portions thereof, respectively, the inclined surfaces being so formed as to extend in a direction opposite to each other so that the first and second deforming members are not overlapped on each other when the first and second deforming members are plastically deformed by the load applied to the webbing.

9. The seat belt winding device of claim 7, wherein the plastically deforming member includes an end portion formed in an arc-shaped surface.

10. The seat belt winding device of claim 3, wherein the clamp teeth of the clamp member include first clamp teeth with sharpened ends and second clamp teeth with flat ends, the sharpened ends of the first clamp teeth being shearable or deformable when a tensile force acting on the webbing exceeds a predetermined value during the holding of the webbing between the lower plate and the clamp member, and wherein the lower plate includes a webbing escaping recess on a front upper surface thereof, the webbing escaping recess allowing a part of the first clamp teeth, which are stuck to the webbing, to disengage from the webbing when a plastic deformation of the upper plate is completed.

11. The seat belt winding device of claim 3, wherein the retractor base includes a pair of mutually opposing base side plates and a base back plate portion connecting the base side plates, each of the base side plates including a guide groove, the upper plate being movable in the webbing draw-out direction along the guide groove, and wherein the holding means includes:

a side wall portion to be fixed to one of the base side plates of the retractor base in a side edge in a width direction of the holding means;

a plastically deforming portion coupling to the side wall portion and having a longitudinal section bent in a U-liked shape, and a plate support portion situated on an end of the plastically deforming portion for fixing the upper plate.

12. The seat belt winding device of claim 3, wherein the retractor base includes a pair of mutually opposing base side plates and a base back plate portion connecting the base side plates, each of the base side plates including a guide groove, the upper plate being movable in the webbing draw-out direction in the guide groove, and wherein the holding means includes:
 a projecting piece to be mounted on one of the base side plates of the retractor base on an upper end portion of the holding means;
 a plate support portion for fixing the upper plate on a lower end portion of the holding means; and
 a plastically deforming portion formed upwardly of the plate support portion and bent in corrugated shape,
 the holding means having a transverse width greater than a distance between both the base side plates of the retractor base, the plastically deforming portion having a corrugated height substantially equal to an opening width of the guide groove of the retractor base.

13. The seat belt winding device of claim 3, wherein the retractor base includes a pair of mutually opposing base side plates and a base back plate portion connecting the base side plates, each of the base side plates including a guide groove extending in the same direction along the base back plate portion, wherein the upper plate is fixed to a slide plate having an end portion inserted into the guide groove, the upper plate including a through hole extending in a longitudinal direction thereof, and wherein the holding means includes:
 a slit formed in one of the base side plates of the retractor base in parallel to the guide groove and
 a through pin inserted into the through hole of the upper plate,
 the slit having substantially the same shape as a transverse section of the through pin and including an open support portion for supporting the through pin and an elongated hole portion extending upwardly from the open support portion and having a width smaller than a diameter of the through pin,
 the elongated hole portion being plastically deformed in accordance with the movement of the clamp member in the webbing draw-out direction.

14. A seat belt winding device for a webbing in a vehicle, comprising:

a retractor base;

a winding shaft rotatably supported by the retractor base; and a bobbin rotated integrally with the winding shaft, the bobbin including a plastically deforming member on an outer periphery of the bobbin, the plastically deforming member being of a strength to be deformed by a load acting on the webbing which exceeds a first predetermined value:

clamping means disposed in the retractor base for directly holding the webbing in an emergency of the vehicle, the clamping means releasing the webbing from holding when a load acting on the webbing exceeds a second predetermined value.

15. The seat belt winding device of claim 14, wherein the plastically deforming member includes a cylindrical base portion and a projecting portion having a substantially semicircular section and extending in parallel to the cylindrical base portion in an axial direction thereof, the plastically deforming member fitting a cylindrical collar which has a substantially C-shaped section over an outer periphery of the plastically deforming member.

16. The seat belt winding device of claim 14, wherein the plastically deforming member includes a cylindrical base portion and projecting portions respectively extending outwardly in axial and radial directions of the cylindrical base portion in both axial ends thereof, the plastically deforming members fitting a cylindrical collar which has a substantially C-shaped section over an outer periphery of the plastically deforming member.

17. The seat belt winding device of claim 14, wherein the plastically deforming member includes a cylindrical base portion and projecting portions respectively formed by projectingly cutting both axial ends of the cylindrical base portion, the plastically deforming members fitting a cylindrical collar which has a substantially C-shaped section over an outer periphery of the plastically deforming member.

18. The seat belt winding device of claim 14, wherein the plastically deforming member is so arranged that ribs are formed on the bobbin apart from one another at a predetermined distance in an axial direction of the bobbin, the ribs projecting in the radial direction of the bobbin.

19. The seat belt winding device of claim 18, wherein the plastically deforming member comprises both of first deforming members situated near right and left ends of the bobbin in the axial direction thereof and both of second deforming members situated near a central portion of the bobbin in the axial direction thereof, the first and second deforming members being arranged in four rows spaced apart from one another in the axial direction of the bobbin by a predetermined distance, the first and second deforming members including inclined surfaces in end portions thereof, respectively, the inclined surfaces being so formed as to extend in a direction opposite to each other so that the first and second deforming members are not overlapped on each other when the first and second deforming members are plastically deformed by the load applied to the webbing.

20. The seat belt winding device of claim 18, wherein the plastically deforming member includes an end portion formed in an arc-shaped surface.

* * * * *